(12) United States Patent
Fox et al.

(10) Patent No.: US 12,304,781 B2
(45) Date of Patent: May 20, 2025

(54) LIFTING AND TRANSPORT DEVICE

(71) Applicant: MILWAUKEE ELECTRIC TOOL CORPORATION, Brookfield, WI (US)

(72) Inventors: Caroline Fox, Richfield, WI (US); John S. Scott, Brookfield, WI (US); Matthew Post, Milwaukee, WI (US); Jonathan L. Lambert, Milwaukee, WI (US); Isabel M. Lloyd, West Allis, WI (US); Julia L. Savich, Shorewood, WI (US); Matthew N. Thurin, Richfield, WI (US); Kyle Reeder, Waukesha, WI (US); Logan M. Hietpas, Glendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 448 days.

(21) Appl. No.: 17/636,465

(22) PCT Filed: Sep. 11, 2020

(86) PCT No.: PCT/US2020/050432
§ 371 (c)(1),
(2) Date: Feb. 18, 2022

(87) PCT Pub. No.: WO2021/050894
PCT Pub. Date: Mar. 18, 2021

(65) Prior Publication Data
US 2022/0297990 A1 Sep. 22, 2022

Related U.S. Application Data

(60) Provisional application No. 63/039,689, filed on Jun. 16, 2020, provisional application No. 63/007,658,
(Continued)

(51) Int. Cl.
*B66F 9/18* (2006.01)
*B62B 3/06* (2006.01)
(Continued)

(52) U.S. Cl.
CPC .............. *B66D 1/12* (2013.01); *B62B 3/0612* (2013.01); *B66D 1/46* (2013.01); *B62B 2203/10* (2013.01); *B62B 2203/72* (2013.01)

(58) Field of Classification Search
CPC .................................. B66F 9/187; B66F 9/08
See application file for complete search history.

(56) References Cited

U.S. PATENT DOCUMENTS 3,376,061 A 4/1968 Harris et al.
3,587,892 A * 6/1971 Vermette ................. B66F 9/187
187/244

(Continued)

FOREIGN PATENT DOCUMENTS

CN 104003296 B 4/2016
CN 205953442 U 2/2017
(Continued)

OTHER PUBLICATIONS

KR 2016-0066016 (S-Tech Co Ltd) Jun. 9, 2016 (English language machine translation). [online] [retrieved May 8, 2024]. Retrieved from: espacenet. (Year: 2016).*
(Continued)

*Primary Examiner* — Jonathan Snelting
(74) *Attorney, Agent, or Firm* — Michael Best & Friedrich LLP

(57) ABSTRACT

A device is operable to lift and transport a pipe at a worksite. The device includes a base, a mast coupled to the base, and a carriage coupled to the mast upon which the pipe is supportable. The device further includes a lifting assembly that is operable to move the mast and the carriage in a first
(Continued)

direction to a desired elevation relative to the base and a positioning assembly that is operable to move the carriage relative to the mast in a second direction that is transverse to the first direction.

11 Claims, 22 Drawing Sheets

Related U.S. Application Data filed on Apr. 9, 2020, provisional application No. 62/899,721, filed on Sep. 12, 2019, provisional application No. 62/899,720, filed on Sep. 12, 2019.

(51) Int. Cl.
*B66D 1/12* (2006.01)
*B66D 1/46* (2006.01)

(56) References Cited

U.S. PATENT DOCUMENTS

| | | | | |
|---|---|---|---|---|
| 5,122,027 | A | * | 6/1992 | Tabayashi .............. B66C 1/625 414/454 |
| 5,417,541 | A | * | 5/1995 | Herron .................... B66F 9/06 414/346 |
| 7,789,611 | B2 | | 9/2010 | Wilson |
| 7,824,144 | B2 | | 11/2010 | Wilson |
| 11,077,509 | B2 | | 8/2021 | VanDaalwyk et al. |
| 2007/0292249 | A1 | | 12/2007 | Wilson |
| 2017/0355524 | A1 | * | 12/2017 | Hognaland .......... B65G 1/0464 |
| 2019/0006980 | A1 | | 1/2019 | Sheeks et al. |
| 2019/0044110 | A1 | | 2/2019 | Sheeks et al. |

FOREIGN PATENT DOCUMENTS

| | | |
|---|---|---|
| CN | 207129915 U | 3/2018 |
| CN | 107902606 A | 4/2018 |
| CN | 107986169 A | 5/2018 |
| CN | 207581294 U | 7/2018 |
| CN | 207618963 U | 7/2018 |
| CN | 108861060 A | 11/2018 |
| CN | 109179267 A | 1/2019 |
| DE | 4231656 A1 | 5/1993 |
| EP | 0382573 A1 | 8/1990 |
| EP | 1953112 A1 | 8/2008 |
| FR | 2337095 A1 | 7/1977 |
| JP | 2001048468 A | 2/2001 |
| KR | 200211313 Y1 | 1/2001 |
| KR | 1020080029094 A | 4/2008 |
| KR | 101506634 B1 | 3/2015 |
| KR | 1020160066016 A | 6/2016 |

OTHER PUBLICATIONS

KR 2008-0029094 (Lee Bong Kyu) Apr. 3, 2008 (English language machine translation). [online] [retrieved May 9, 2024]. Retrieved from: espacenet. (Year: 2008).*

KR 20-0211313 (Yang Hong Mo) Aug. 11, 2000 (English language machine translation). [online] [retrieved May 9, 2024]. Retrieved from: espacenet. (Year: 2000).*

Extended European Search Report for Application No. 20862563.2 dated Sep. 21, 2023 (9 pages).

International Search Report and Written Opinion for Application No. PCT/US2020/050432 dated Dec. 8, 2020 (15 pages).

\* cited by examiner

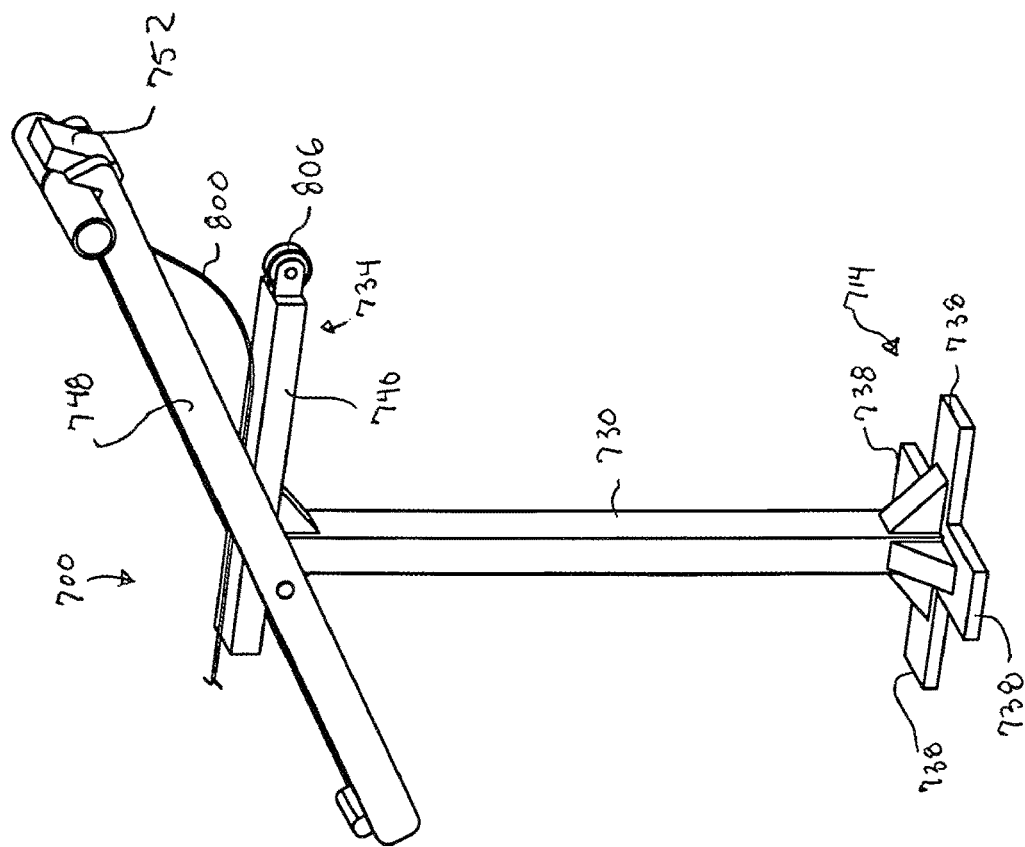
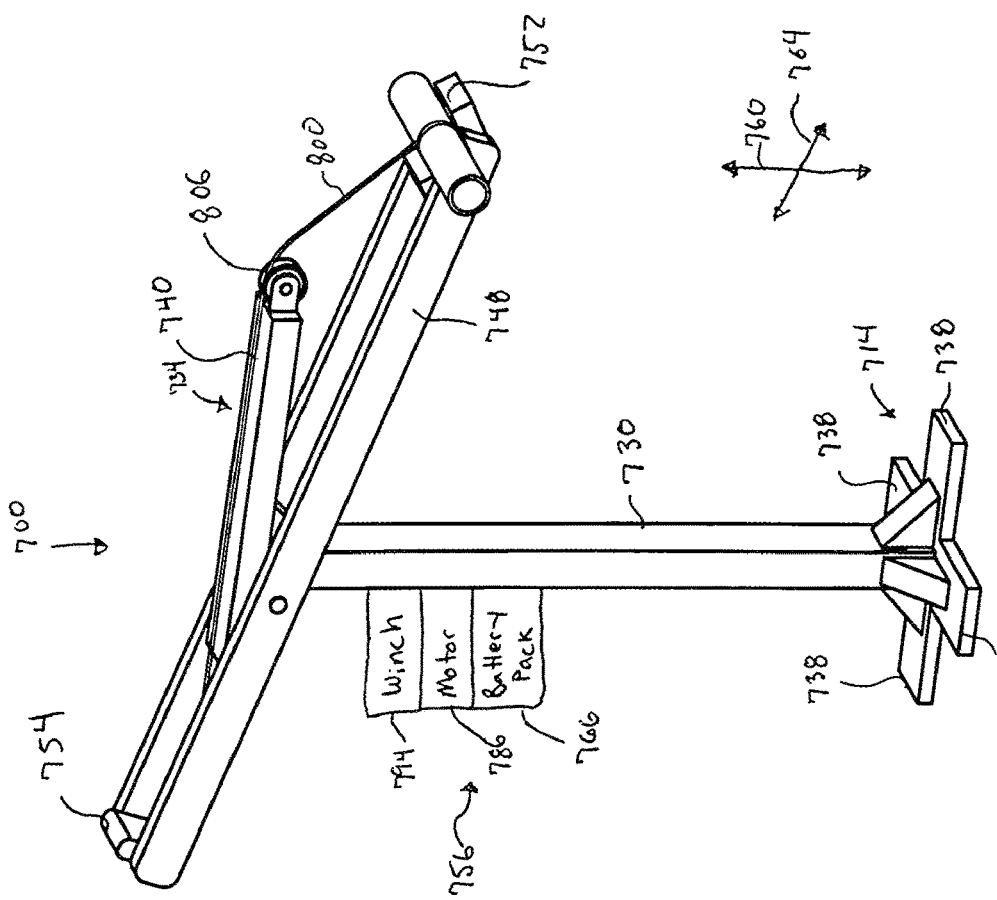
FIG. 26B
FIG. 26A

LIFTING AND TRANSPORT DEVICE

CROSS-REFERENCE TO RELATED APPLICATIONS

This application is a national stage filing under 35 U.S.C. § 371 of International Application No. PCT/US2020/050432 filed on Sep. 11, 2020, which claims priority to U.S. Provisional Patent Application No. 63/039,689 filed on Jun. 16, 2020 and U.S. Provisional Patent Application No. 63/007,658 filed on Apr. 9, 2020, the entire content of which is incorporated herein by reference.

This application also claims priority to U.S. Provisional Patent Application Nos. 62/899,721 and 62/899,720 both filed on Sep. 12, 2019, the entire contents of both which are incorporated herein by reference.

FIELD OF THE INVENTION

The present invention relates to lifting devices. More specifically, the lifting device may be used to support material (e.g., pipes, weights, etc.) and aid in moving the material to a desired height and location (e.g., an installation height). The lifting devices of the present disclosure may navigate lifted material around, and in between, obstacles found on a jobsite. These obstacles include, but are not limited to, existing pipes, ducts, conduit, walls and wires. For the instance of pipe being lifted, the invention holds the pipe in a location in which it can be installed on anchors, or to previously installed pipe, in a safe, controlled manner. While the lifting devices described below are used for pipes (e.g., plastic, metal, aluminum, etc.), it should be appreciated that the devices may be used to lift any material.

BACKGROUND OF THE INVENTION

Current lifting devices make it difficult for a single operator to lift material from the ground and install the material at a desired height and location. During the process, current lifting devices provide strain to the operator during loading of the material onto the lifting device, during manual adjustment (e.g., cranking) of the material to the desired height, and during unloading of the material at the desired height. For many current lifting devices, two or more operators are required to lift the material to the desired height. The present disclosure provides a lifting device that may be used by a single operator and may alleviate strain on the operator.

SUMMARY OF THE INVENTION

The present invention provides, in one aspect, in one aspect, a device configured to lift and transport a pipe at a worksite. The device includes a base, a mast coupled to the base, a carriage coupled to the mast upon which the pipe is supportable, a lifting assembly configured to move the mast and the carriage in a first direction to a desired elevation relative to the base; and a positioning assembly configured to move the carriage relative to the mast in a second direction that is transverse to the first direction.

The present invention provides, in another aspect, a device configured to lift and transport a pipe at a worksite. The device includes a base, a mast coupled to the base, a carriage coupled to the mast, a positioning assembly including a cable that is attachable to the pipe for lifting the pipe from a surface of the worksite to the carriage, upon which the pipe is thereafter supportable; and a lifting assembly configured to move the mast and the carriage to a desired elevation relative to the base to further lift the pipe from the worksite surface.

The present invention provides, in another aspect a device configured to lift and transport a pipe at a worksite. The device including a base, a mast coupled to the base, a carriage coupled to the mast upon which the pipe is supportable, and means for lifting the pipe in a first direction to a desired elevation relative to the base and moving the pipe along the carriage in a second direction that is transverse to the first direction.

Other features and aspects of the invention will become apparent by consideration of the following detailed description and accompanying drawings.

BRIEF DESCRIPTION OF THE DRAWINGS

FIG. 26A is a perspective view of the lifting device of FIG. 23A illustrating a second carriage at a first elevation.

FIG. 26B is a perspective view of the lifting device of FIG. 23A illustrating a second carriage at a first elevation.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
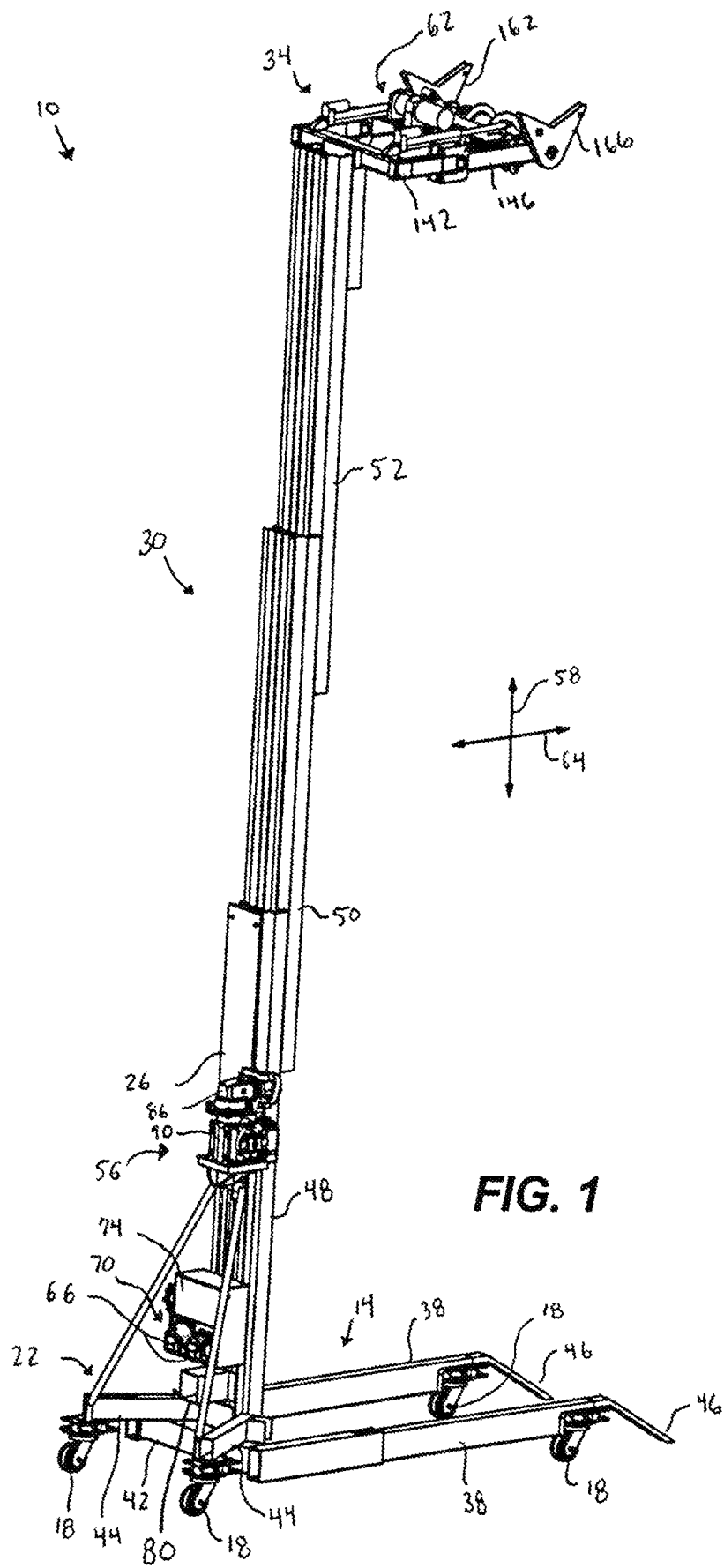
FIG. 1 is a perspective view of a lifting device.

FIG. 1 illustrates a lifting device 10 that is able to rigidly or non-rigidly lift materials (e.g., pipes, weights, etc.) and move the material to a desired height and location (e.g., an installation height). The lifting device 10 includes a base 14 having a plurality of wheels 18, a support structure 22 having a first end coupled to the base 14 and a second end coupled to a back plate 26, a mast 30 coupled to and supported by the base 14, and a carriage 34 coupled to the mast 30.

In the illustrated embodiment, the base 14 includes parallel first and second frame rails 38 that extend from each end of a cross-beam 42, and an additional two rails 44 that obliquely extend from the cross-beam 42. The wheels 18 are coupled to a distal end of each of the rails 38, 44. As a result, wheels 18 are positioned in each corner of the base 14. A ramp 46 may be pivotably coupled to a distal end of the first and second frame rails 38 to provide a surface for a pipe to be moved along during a lifting operation. In some embodiments, the first and second frame rails 38 may pivot relative to the cross-beam 42 to facilitate movement and storage of the lifting device 10. In the illustrated embodiment, the base 14 has a width of approximately 32 inches.

The mast 30 includes a first (stationary) mast portion 48 that is rigidly coupled to the backplate 26 and the cross-beam 42, and second and third (movable) mast portions 50, 52 that are coupled to and movable relative to the first mast portion 48. In other embodiments, more or fewer mast portions may be used. In the illustrated embodiment, each mast portion 48, 50, 52 of the mast 30 includes a telescoping structure that engages with a corresponding mast portion so the mast 30 and the carriage 34 are movable between a plurality of positions. For example, the telescoping structures may be a track formed on an outer surface of the mast portions 48, 50, 52. The track may receive a roller that allows movement of the mast portions 50, 52 relative to the first mast portion 48 and each other.

With continued reference to FIG. 1, the lifting device 10 includes a lifting assembly 56 that is coupled to the mast 30 and is operable to move the mast 30 and the carriage 34 in a first (vertical) direction 58 to a desired elevation relative to the base 14. A positioning assembly 62 is coupled to the carriage 34 and is operable to move the carriage 34 relative to the mast 30 in a second (lateral) direction 64 that is transverse to the first direction 58. Both the lifting assembly 56 and the positioning assembly 62 receive electrical power from one or more battery packs 66.

Figure 2:
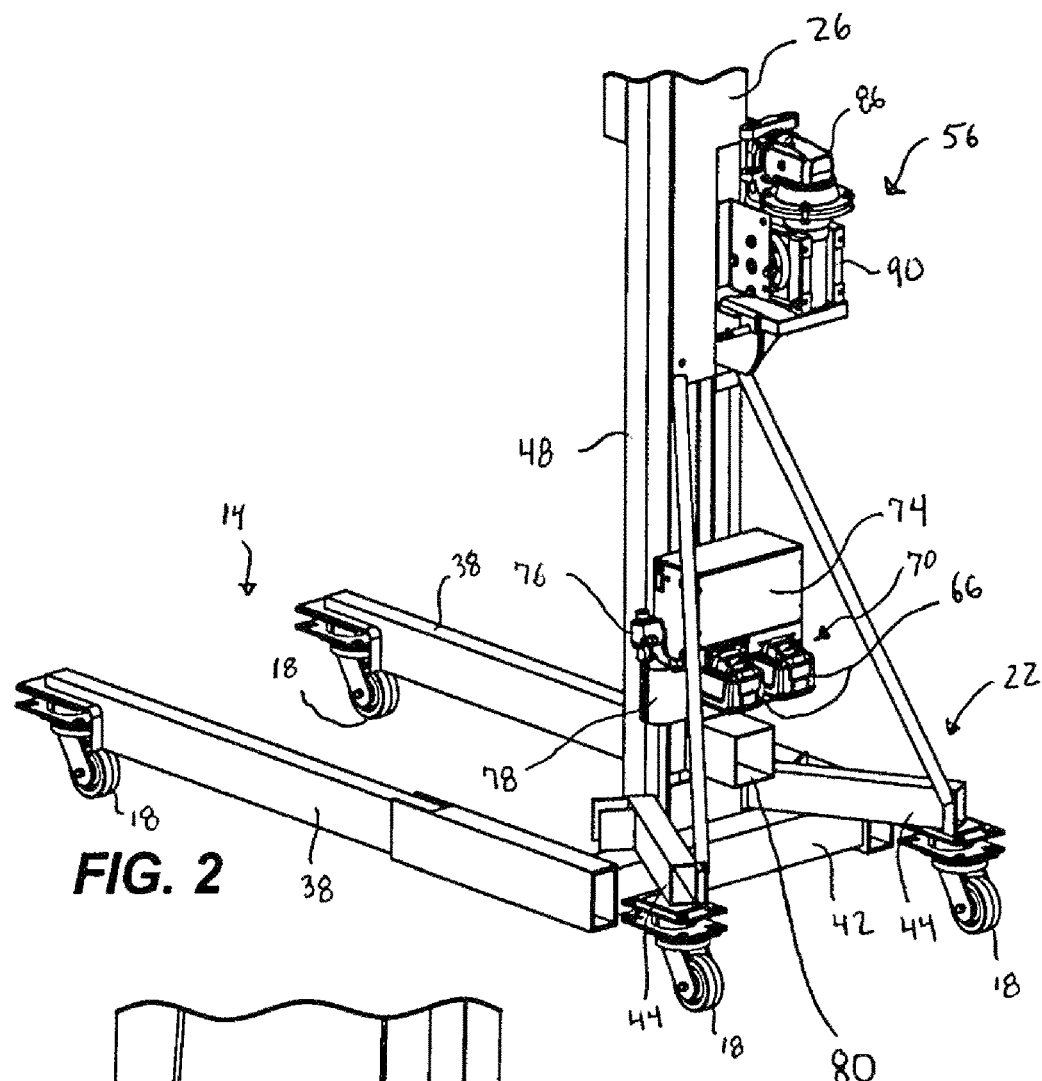
FIG. 2 is a perspective view of a portion of the lifting device.

Now with reference to FIG. 2, the one or more battery packs 66 are secured within a battery receptacle 70 that is coupled to the first mast portion 48. An electronics housing 74 is formed above the battery receptacle 70. A remote control 76 (FIGS. 2, 4, and 13) is tethered to the lifting device 10 (e.g., via a wired connection with the electronics housing 74) to control the movement of the mast 30 and the carriage 34. The remote control 76 may be housed in a control housing 78 positioned adjacent the battery receptacle 70. For example, the control housing 78 is coupled to the battery receptacle 70 (e.g., via fasteners) to allow the operator to store the remote control 76 when the remote control 76 is not in use.

The base 14 further includes a driven wheel mount 80 supported by the base 14. In the illustrated embodiment, the driven wheel mount 80 is sized to receive a driven wheel 82 (shown in FIG. 5). The battery packs 66 provide electrical power to the driven wheel 82. In the illustrated embodiment, the driven wheel mount 80 is positioned adjacent (i.e., below) the battery receptacle 70.

Figure 3:
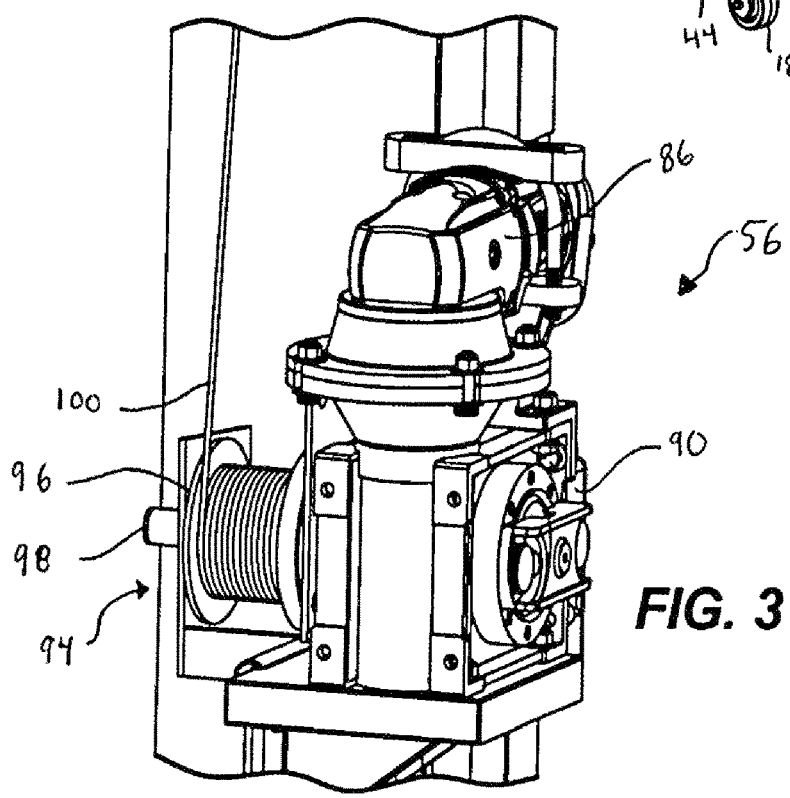
FIG. 3 is a perspective view of a lifting assembly for the lifting device.

Now with reference to FIG. 3 the lifting assembly 56 is illustrated in detail. The lifting assembly 56 includes an electric motor 86, a gearbox assembly 90, and a winch 94 driven by the electric motor 86. The winch 94 includes a spool 96 driven by a rotary shaft 98 and a cable 100 wound around the rotary shaft 98 and coupled to the mast 90. The electric motor 86 is configured to alternately wind and unwind the cable 100 for raising and lowering the mast 30 relative to the base 14. In the illustrated embodiment, the cable 100 is affixed to the movable mast portions 50, 52 for alternately raising and lowering the movable mast portions 50, 52 relative to the stationary mast portion 48. The gearbox 90 is positioned between and is operable to connect the electric motor 86 and the winch 94.

In some embodiments, the electric motor 86 is a brushless direct-current (BLDC) motor having a power output of at least about 1800 W and an nominal outer diameter of up to about 70 mm, when used with a battery pack 66 having a sustained operating discharge current of at least 100 A and a nominal voltage of 20 V or less. Such a motor 86 and battery pack 66 are disclosed in U.S. patent application Ser. No. 16/045,513 filed on Jul. 25, 2018, the entire content of which is incorporated herein by reference. In other embodiments, the electric motor 86 may be a BLDC motor having a power output of at least about 2760 W and a nominal outer diameter of up to about 80 mm, when used with a battery pack 66 having a nominal voltage of 80 V and a sustained operating discharge current of between about 40 A and about 60 A. Such a motor 86 and battery pack 66 are disclosed in U.S. patent application Ser. No. 16/025,491 filed on Jul. 2, 2018, the entire content of which is incorporated herein by reference.

Figure 4A:
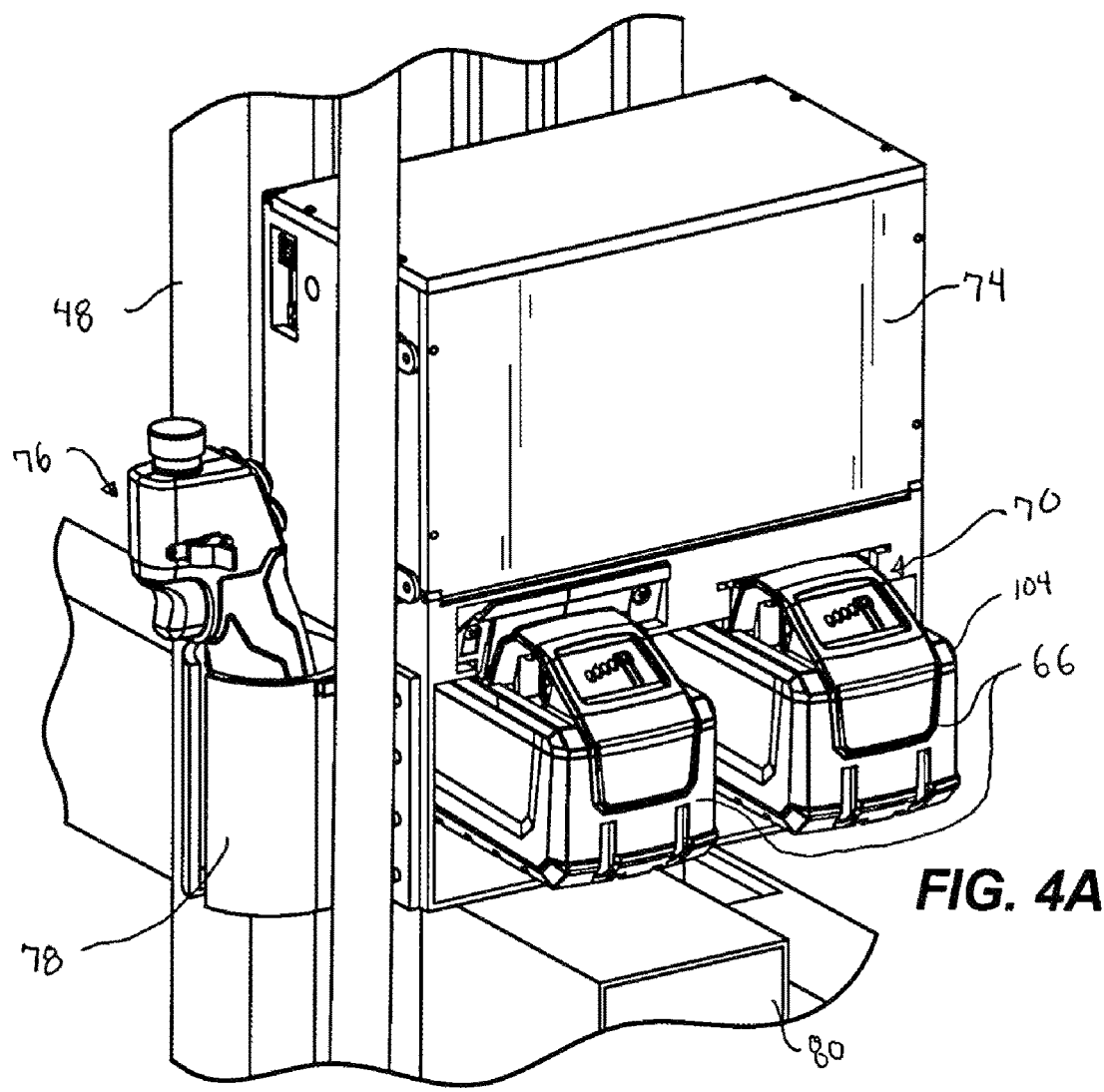
FIG. 4A is a perspective view of a battery receptacle of the lifting device.
Figure 4B:
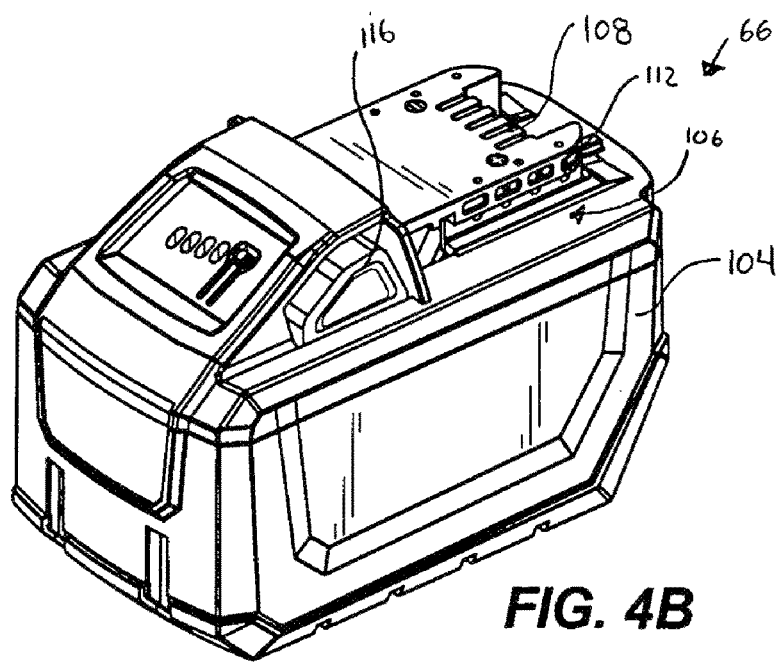
FIG. 4B is a perspective view of battery pack that may be received within the battery receptacle of FIG. 4A.
Figure 4C:
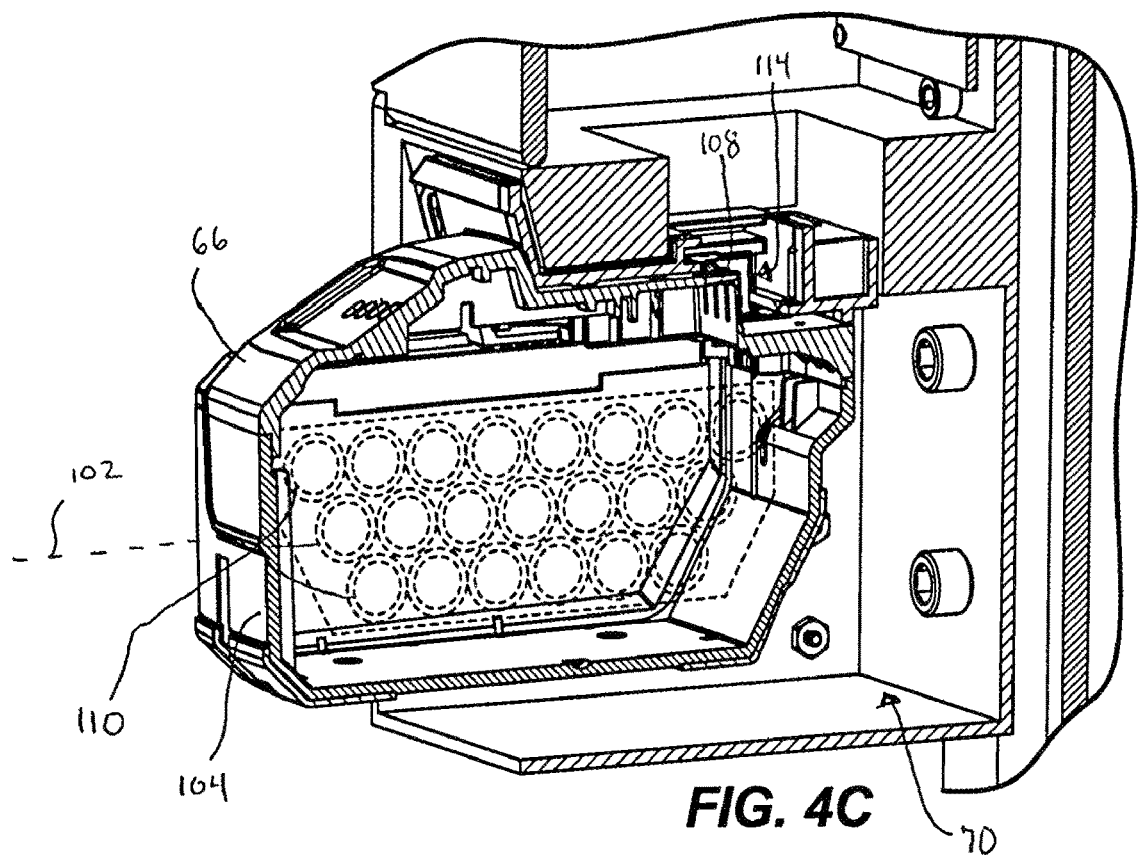
FIG. 4C is a perspective, cross sectional view of the battery receptacle of FIG. 4A.

Now with reference to FIG. 4A-4C, the battery receptacle 70 is sized to removably receive two battery packs 66 that transfer current from the battery packs 66 to the electric motor 86. The battery packs 66 are configured to be inserted within the battery receptacle 70 along an insertion axis 102. The insertion axis 102 is parallel to the base 14 and is transverse to the mast 30. The battery packs 66 each include a battery pack housing 104 with a support portion 106 and a first terminal 108 that is electrically connected to a plurality of battery cells 110 supported by the pack housing 104. In some embodiments, the battery pack 66 may include up to twenty battery cells, each of which having a capacity between about 3.0 Ah and about 5.0 Ah.

The support portion 106 provides a slide-on arrangement with a projection/recess portion 112 cooperating with a complementary projection/recess portion 114 of the battery receptacle 70. The battery pack 66 further includes a latch mechanism 116 coupled to the pack housing 104 to selectively secure the battery pack 66 in the battery receptacle 70.

In other embodiments, the battery receptacle 70 may be alternatively positioned on the lifting device 10. For example, in other embodiments, the insertion axis 102 may be parallel with the mast 30. The electronics housing 74 may house electrical components of the lifting device 10 such as a processor, that communicates with the lifting assembly 54, the driven wheel 82, the positioning assembly 62, etc.

Figure 5:
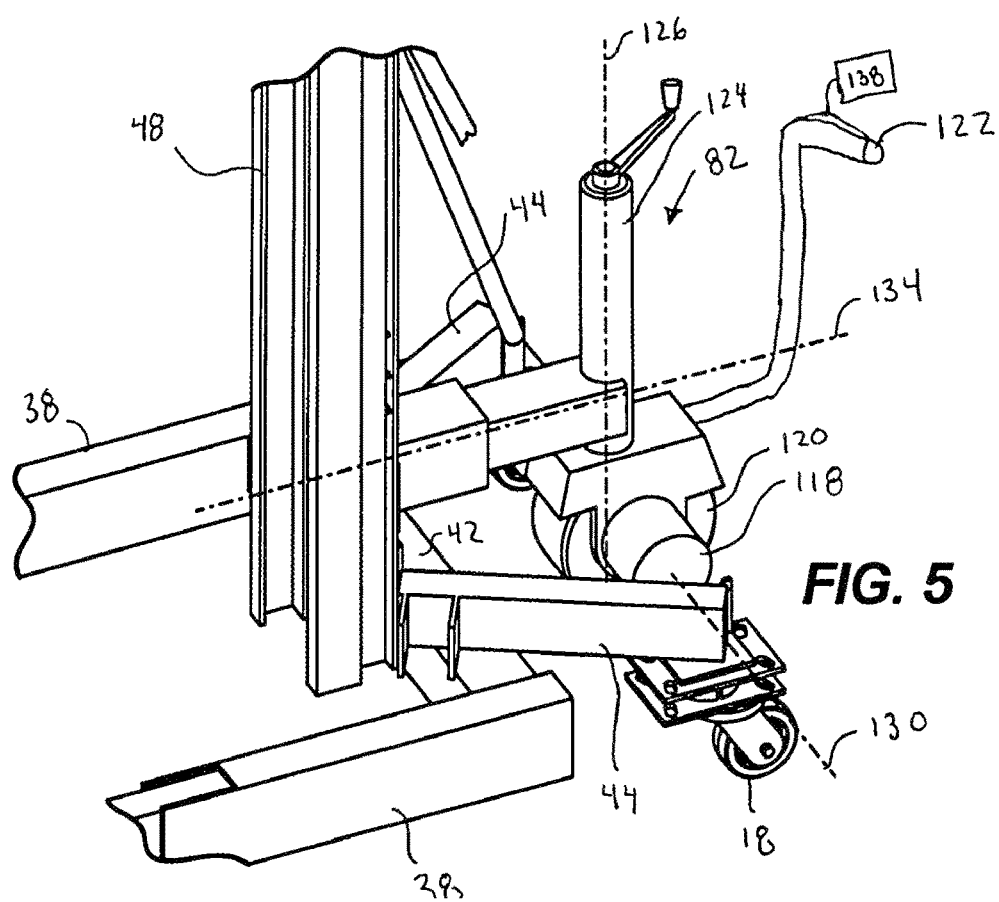
FIG. 5 is a perspective view of a driven wheel mounted to a portion of the lifting device.

Now with reference to FIG. 5, the driven wheel 82 includes a motor 118, a wheel 120, a handle 122, and a jack 124. The driven wheel 82 is pivotably coupled to the base 14 via the driven wheel mount 80 and is pivotable about a vertical axis 126. The vertical axis 126 is oriented transverse to a horizontal rotational axis 130 of the wheel 120 and is transverse to a mounting axis 134 that extends through the driven wheel mount 80. The handle 122 is configured to adjust an orientation of the driven wheel 82 about the vertical axis 126 for steering the lifting device 10. The jack 124 couples the driven wheel 82 to the base 14 via the driven wheel mount 80 and is operable to adjust a spacing of the driven wheel 82 relative to the base 14 along the vertical axis 126. The handle 122 may further include a hand control 138 for selectively activating the electric motor 118, which may receive power from the one or more battery packs 66.

Figure 6:
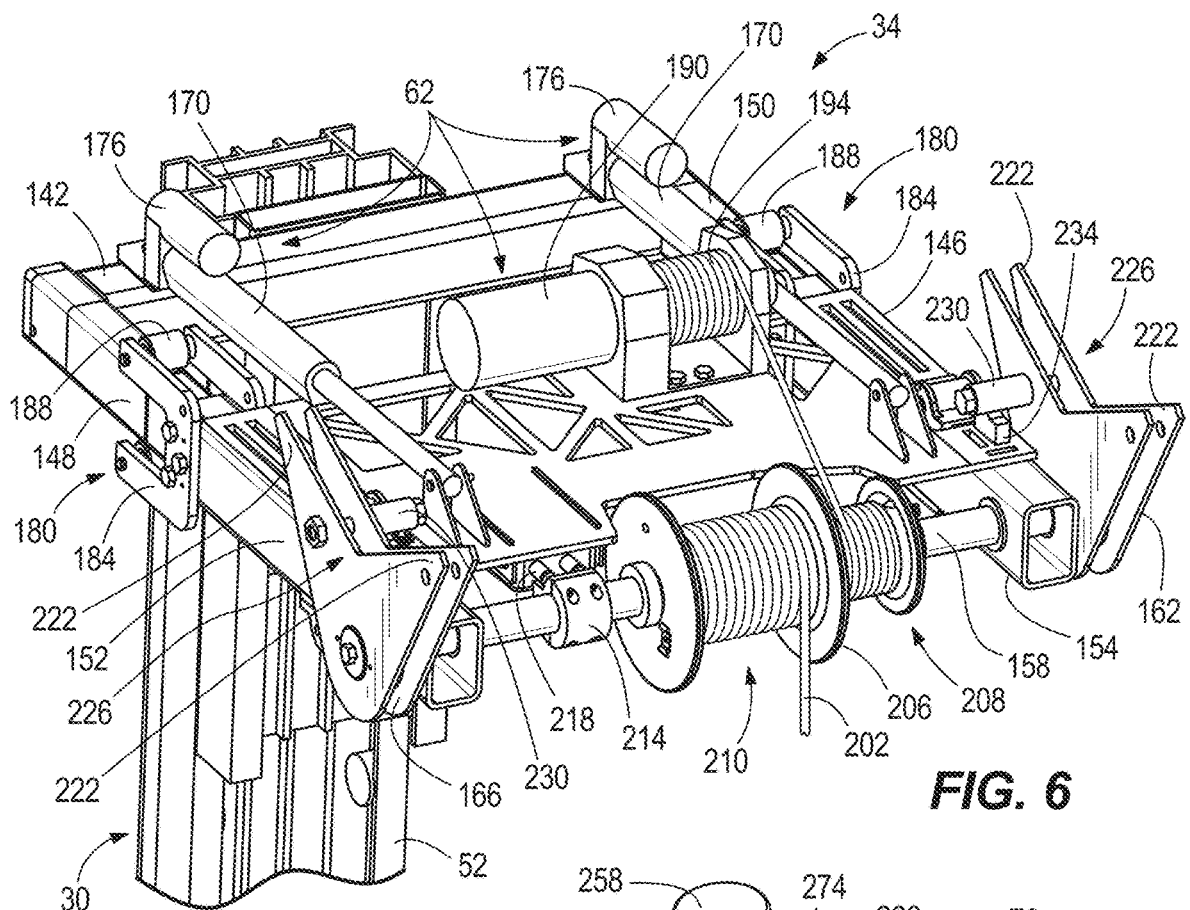
FIG. 6 is a perspective view of a carriage of the lifting device.

Now with reference to FIG. 6, the carriage 34 includes a first carriage portion 142 coupled to the mast 30 and a second carriage portion 146 coupled to and movable relative to the first carriage portion 142. The first carriage portion 142 defines first and second forks 148, 150 that extend laterally from the mast 30. The second carriage portion 146 includes first and second support members 152, 154 that are sized to respectively receive the first and second forks 148 of the first carriage portion 142. The carriage 34 further includes a rotary shaft 158 (e.g., an actuator) coupled to the second carriage portion 146 and extending between the first and second support members 152, 154, a first arm 162 coupled to a first end of the rotary shaft 158, and a second arm 166 coupled to an opposite, second end of the rotary shaft 158.

The position assembly 62 includes a pair of linear actuators 170 having a first end coupled to the first carriage portion 142 and a second end coupled to the second carriage portion 146. The linear actuators 170 are selectively operable to adjust the second carriage portion 146 between a retracted position, in which the second carriage portion 146 is proximate the mast 30, and an extended position, in which the second carriage portion 146 is located farther from the mast 30. In the illustrated embodiment, each linear actuator 170 is driven by an electric motor 176, which may receive power from the one or more battery packs 66, and the support members 152, 154 are operably coupled to the forks 148, 150 of the first carriage portion 142 via a roller mechanism 180. For example, the roller mechanism 180 may include a bracket 184 with a first end coupled the second carriage portion 146 and a second opposite end sized to receive one or more roller 188. The bracket 184 may have a C-shaped geometry so a first roller 188 engages a top portion of the fork 148, 150 and a second roller 188 (not shown) engages a bottom portion of the fork 148, 144.

The positioning assembly 62 further includes an electric motor 190 coupled to the second carriage portion 146 and a winch 194 that is operably coupled to and driven by the motor 198. The winch 194 includes a cable 202 that is wound around a spool 206 to selectively adjust the position of the rotary shaft 158 and the first and second arms 162, 166 of the carriage 34. For example, actuation of the motor 190 may alternatively wind and unwind the cable 202 to adjust the relative position of the first and second arms 162, 166. In the illustrated embodiment, the spool 206 includes a first portion 208 that receives the cable from the winch 194 and a second portion 210 where the remainder of the cable 202 is supported. During a lifting operation, a free end of the cable 202 may be coupled to a pipe. Therefore, activating the motor 190 to alternatively wind and unwind the cable 202 may also non-rigidly lift a pipe, which is explained in more detail below.

The carriage 34 may further include a deadbolt block 214 that is coupled to the rotary shaft 158. The deadbolt block 214 is sized to engage with a deadbolt 218 coupled to the second carriage portion 146. When the arms 162, 166 of the carriage are in an upright position, as shown in FIG. 6, the operator may activate the deadbolt block 214 to lock (e.g., restrict pivotal movement of) the arms 162, 166. As a result, deadbolt block 214 rigidly fixes the position of the rotary shaft 158 and arms 162, 166 to ensure the arms 162, 166 remain in the upright position during rigid lifting.

The first and second arms 162, 166 each include a pair of spokes 222 that define a recess 226 in which a pipe may be received. In the illustrated embodiment, the recess 226 of the first and second arms 162, 166 are rotationally aligned and define an inverted V-shape to support the pipe therein. As a result, the arms 162, 166 are able to accommodate a plurality of different sized pipes. Each of the first and second arms 162, 166 further include a spoke post 230 that extends inward (e.g., towards the second carriage portion 146) from the arms 162, 166. The spoke post 230 is sized to engage with a spoke catch 234 formed on the second carriage portion 146. For example, when the arms 162, 166 are moved to the upright position, the spoke post 230 engages with the spoke catch 234 to form a hard stop that restricts pivotal movement of the arms 162, 166. The hard stop restricts the arms 162, 166 past the upright position (e.g., in a counterclockwise direction). Once the spoke post 230 engages with the spoke catch 234, the operator may lock the arms 162, 166 and the rotary shaft 158 in the upright position by activating the deadbolt block 214.

Figure 7:
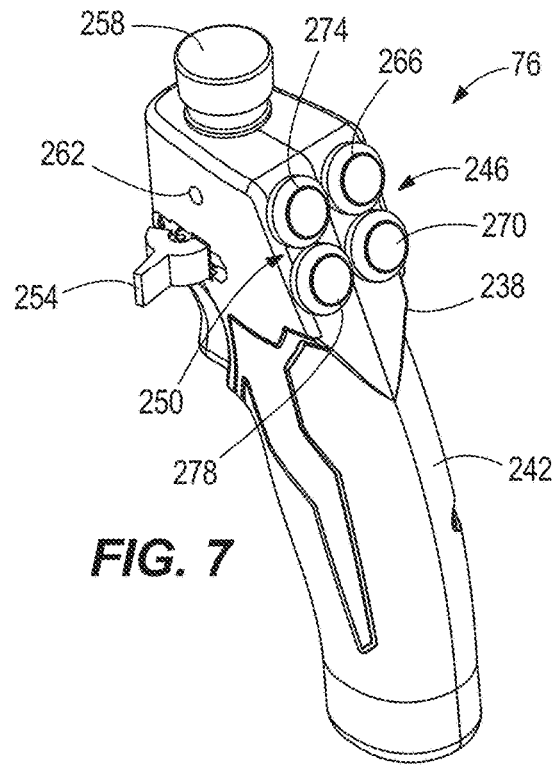
FIG. 7 is a perspective view of a remote control for the lifting device.

Now with reference to FIG. 7, an exemplary embodiment of the remote control 76 is illustrated. The remote control 76 includes a housing 238 defining a handle 242 (e.g., a pistol grip), a first user control 246, a second user control 250, a third user control 254, and an emergency stop button 258. The first user control 246 is operable to control the vertical movement (e.g., in the first direction 58) of the mast 30 relative to the base 14. The second user control 250 is operable to wind and unwind the cable 202, which controls the pivotable movement of the arms 162, 166 of the carriage 34 and allow non-rigid lifting of a pipe to occur. The third user control 254 is operable to control the lateral movement of the second carriage portion 146 relative to the mast 30 and the first carriage portion 142. The emergency stop button 258 is operable to de-energize the lifting device 10. In some embodiments, the remote control 76 may further include a deadbolt button 262 that locks the deadbolt block 214 to the deadbolt 218 so the arms 162, 166 remain fixed in the upright position.

In the illustrated embodiment the first user control 246 includes an up button 266 and a down button 270 that selectively activates the motor 86 of the power lifting assembly 56 (FIG. 1) to move the mast 30 and carriage 34 upward or downward relative to the base 14 (e.g., in the first direction 58). The second user control 250 includes an wind button 270 and an unwind button 274 that selectively activates the motor 190 of the positioning assembly 62 to wind and unwind the cable 202, which controls the pivotable movement of the arms 162, 166 of the carriage 34 or non-rigid lifting of the pipe. The third user control 254 is a lever that may be pivoted or otherwise moved forward or rearward to activate the linear actuators 170 to move the second carriage portion 146 in the second direction 62 relative to the mast 30 (e.g., laterally between a retracted position and an extended position).

While the illustrated remote control 76 includes a pistol grip, it should be appreciated that the remote control 76 may have an alternative shape. At the same time, it should be appreciated that the user controls 246, 250, 254, 258 may take different forms other than buttons (e.g., dial, touch screen display, etc.).

Figure 8:
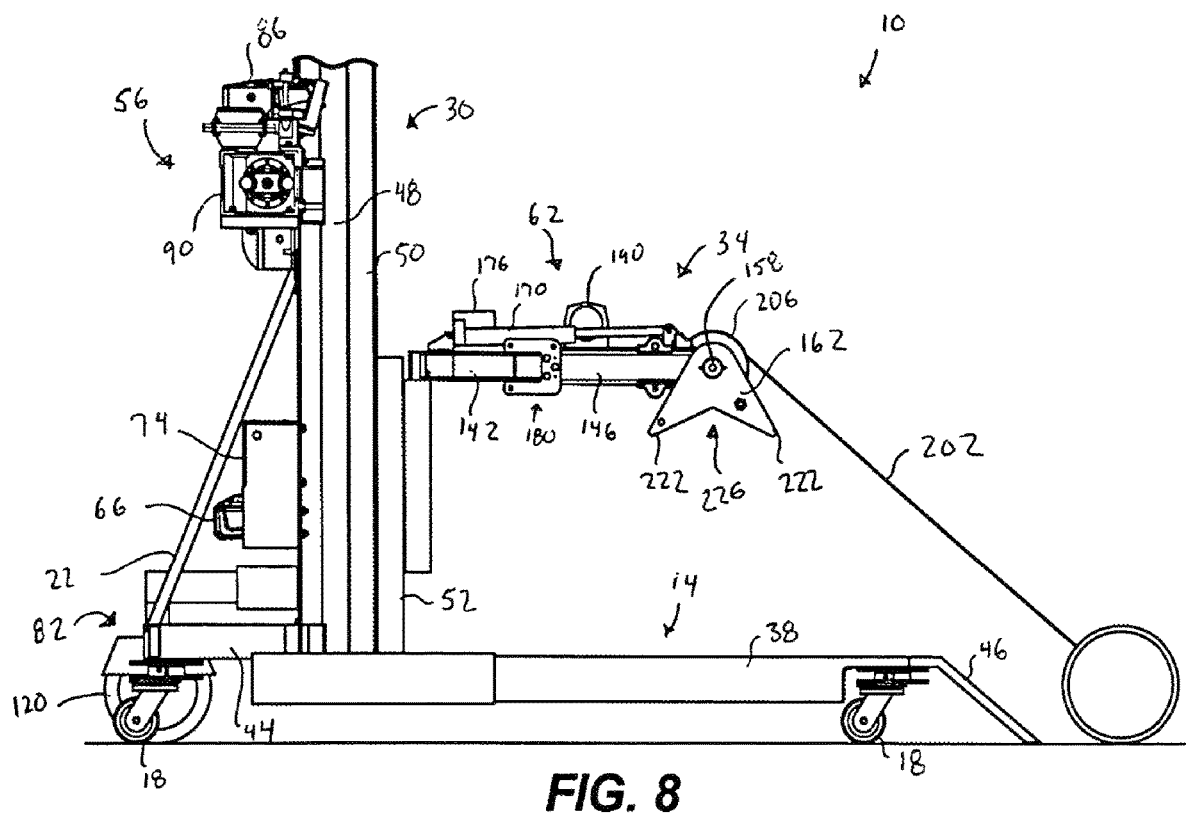
FIG. 8 is a side view of the lifting device illustrating a pipe being non-rigidly lifted by the lifting device.
Figure 9:
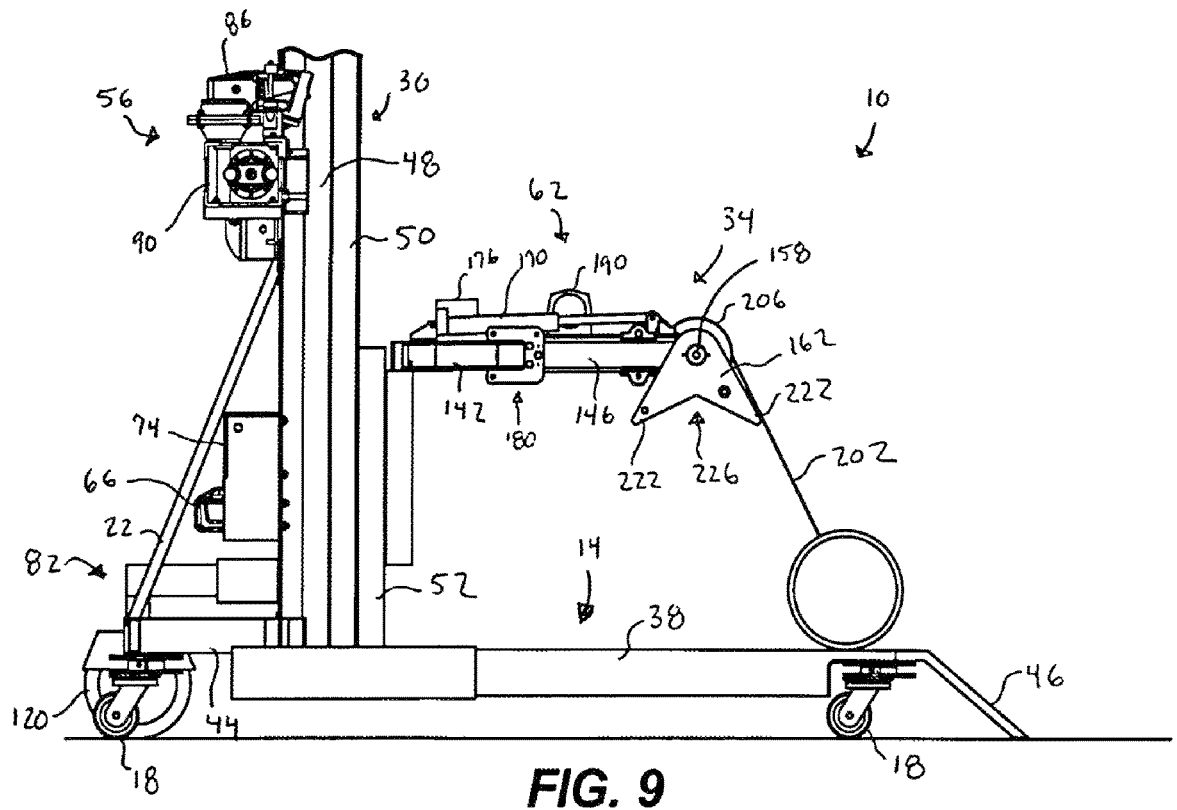
FIG. 9 is a side view of the lifting device illustrating a second position of the pipe as the pipe is being non-rigidly lifted by the lifting device.

Now with reference to FIGS. 8-15, the movement of the carriage 34 and mast 30 are illustrated during a lifting operation. During the lifting operation, the pipe may be rigidly lifted (e.g., lifted from below) or non-rigidly lifted (e.g. lifted from above). For example, the carriage 34 may be moved towards the base 14 and an operator may secure a pipe to the cable 202 (e.g., via a strap). When the user is non-rigidly lifting the pipe, the arms 162, 166 of the carriage 34 are rotated towards the downward facing position (FIGS. 8 and 9). The operator may extend the ramps 46 to transition the frame rails 38 to a surface of the worksite which forms a travel path for the pipe. Using the remote control 76, the motor 190 may be activated to drive the winch 194, which winds the cable 202 around the spool 206. As shown in FIG. 9, activation of the motor 190 moves the pipe along the travel path defined by the ramps 46 and onto the rails 38 of the base 14. For example, the motor 190 is configured to retract the cable 202 on the spool 206, thereby pulling the pipe along the first and second frame rails 38 toward the recesses 226 of the first and second arms 162, 166.

Figure 10:
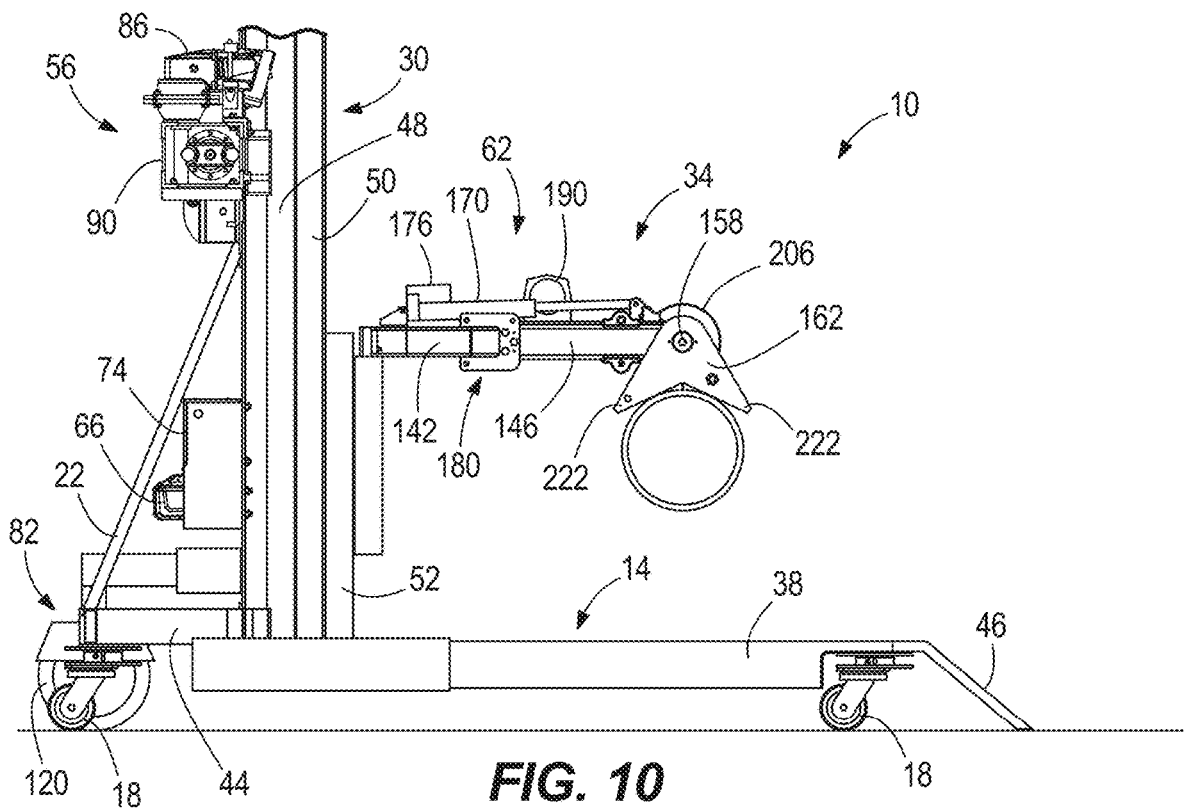
FIG. 10 is a side view of the lifting device illustrating a third position of the pipe being non-rigidly lifted by the lifting device.
Figure 11:
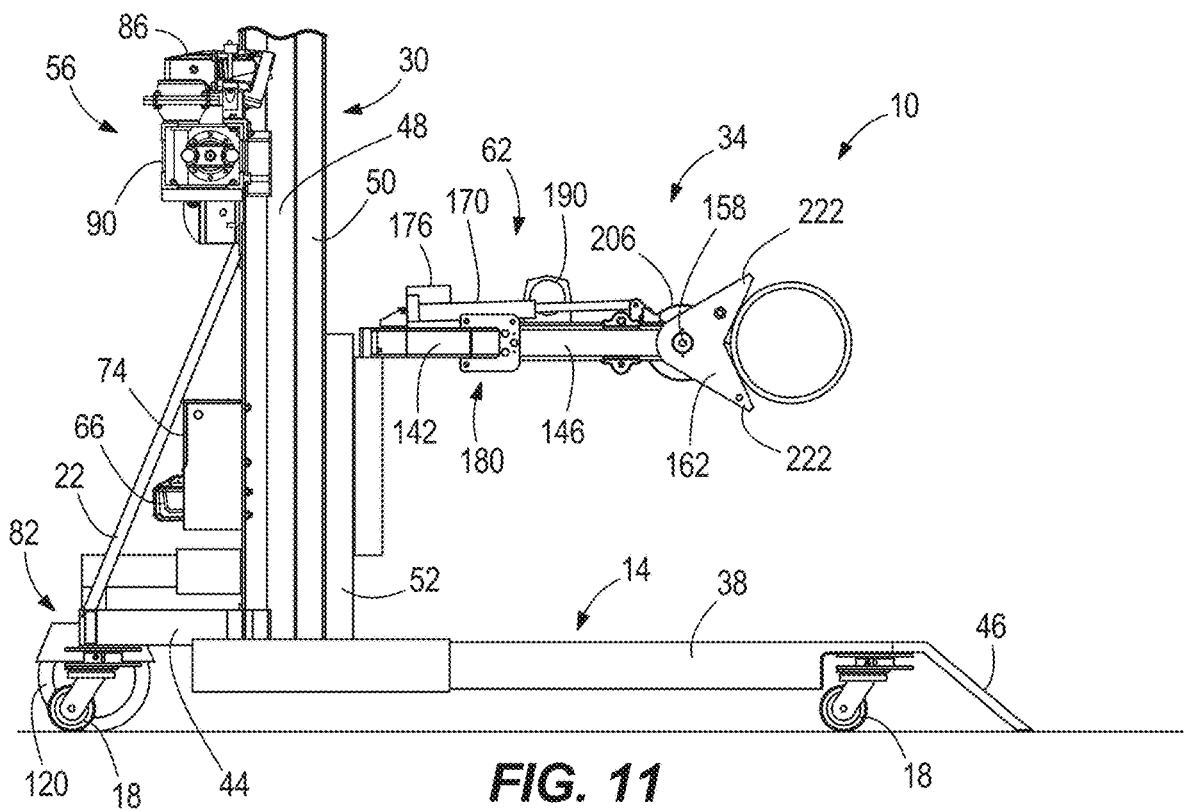
FIG. 11 is a side view of the lifting device illustrating a position of arms of the carriage where recesses of the arms face laterally outward.

Now with reference to FIG. 10, continued activation of the motor 190 (non-rigidly) lifts the pipe is into engagement with the recess 226 and the arms 162, 166 (e.g., non-rigidly lifted). The operator may use the remote control 76 to activate the motor 190 and rotate the arms 162, 166 in a counterclockwise direction towards a second position (FIG. 10) or to a third position (FIG. 11). For example, the arms 162, 166 are pivotably movable between the first position, in which the recess 226 is oriented downward, a second position, in which the recess 226 is oriented upward, and a third position, in with the recess 226 extends in a lateral direction. For example, the rotary shaft 158 receives torque from the electric motor 190 (e.g., via the cable 202), causing the rotary shaft 190 to rotate the arms 162, 166, in which the pipe is received.

Figure 12:
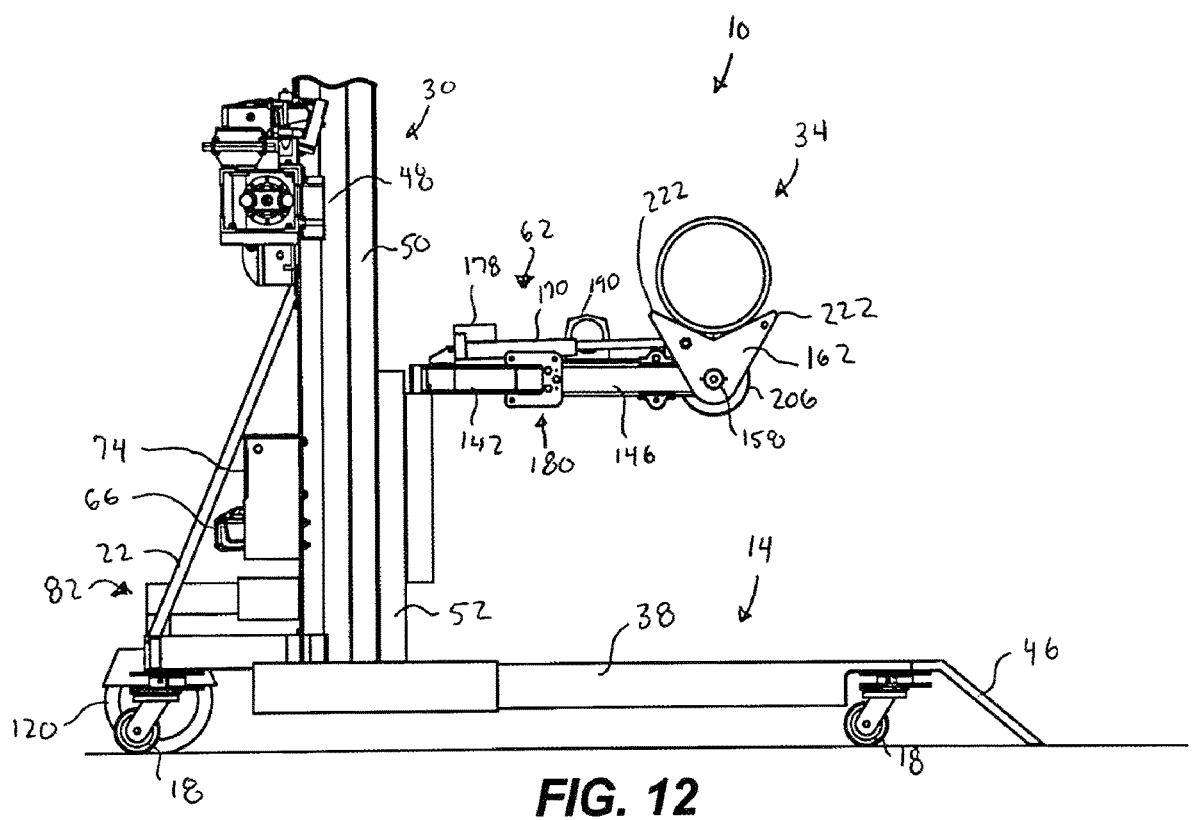
FIG. 12 is a side view of the lifting device illustrating a position of arms of the carriage where recesses of the arms are oriented upward.
Figure 13:
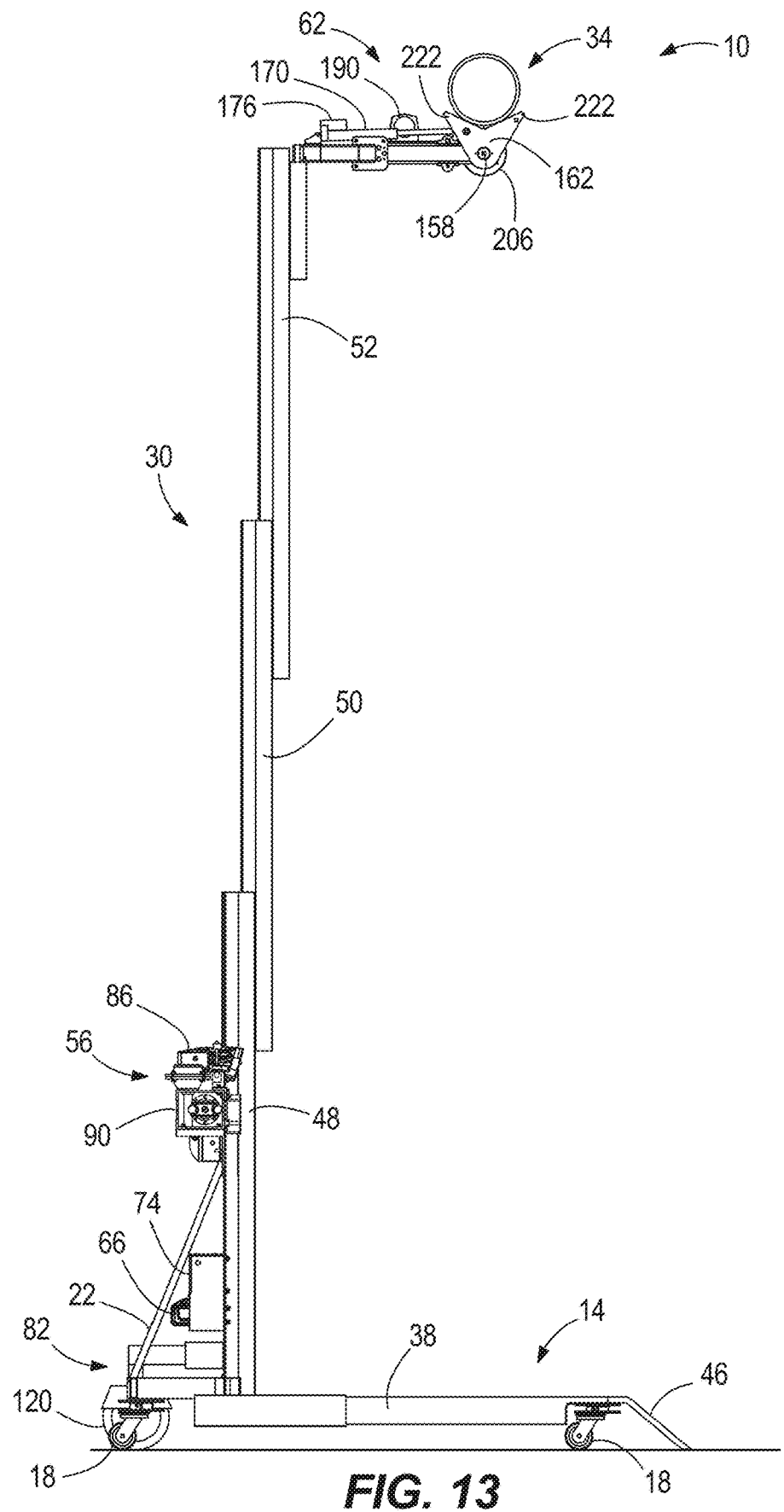
FIG. 13 is a side view of the lifting device illustrating the pipe being rigidly lifted in a first direction to an installation height

Now with reference to FIG. 12, the recesses 226 are oriented upward, which allows the pipe to be rigidly lifted to the desired height and position (FIG. 13). For example, the operator may use the remote control 76 to activate the motor 86 of the lifting assembly 56 and move the mast portions 50, 52 and the carriage 34 in the first direction 58 (e.g., vertically) relative to the stationary mast portion 48 and the base 14.

Figure 14:
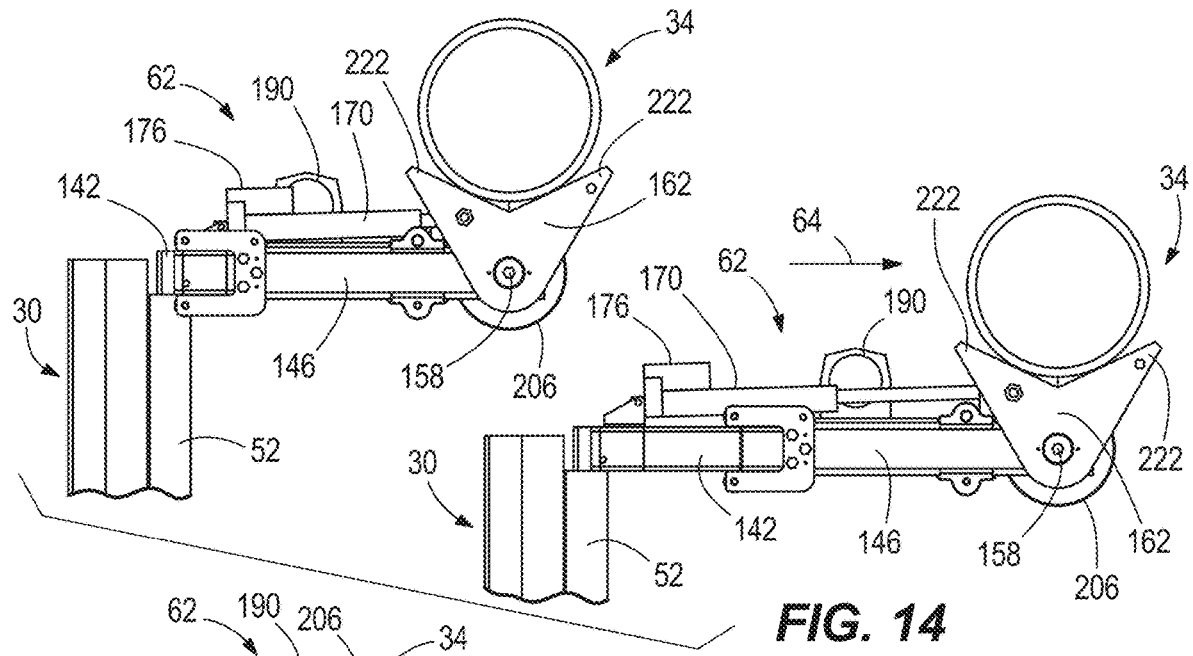
FIG. 14 is a side view of the lifting device illustrating the carriage of the lifting device being adjusted in a second direction between a retracted and an extend position.

Now with reference to FIG. 14, the second carriage portion 146 may be adjusted between a retracted position, in which the second carriage portion 146 is proximate the mast 30, and an extended position, in which the second carriage portion 146 is located farther from the mast 30. For example, the operator may use the remote control 76 to activate the linear actuators 170, which moves the second carriage portion 146 in the second direction 64 relative to the mast 30 and the first carriage portion 142.

Figure 15:
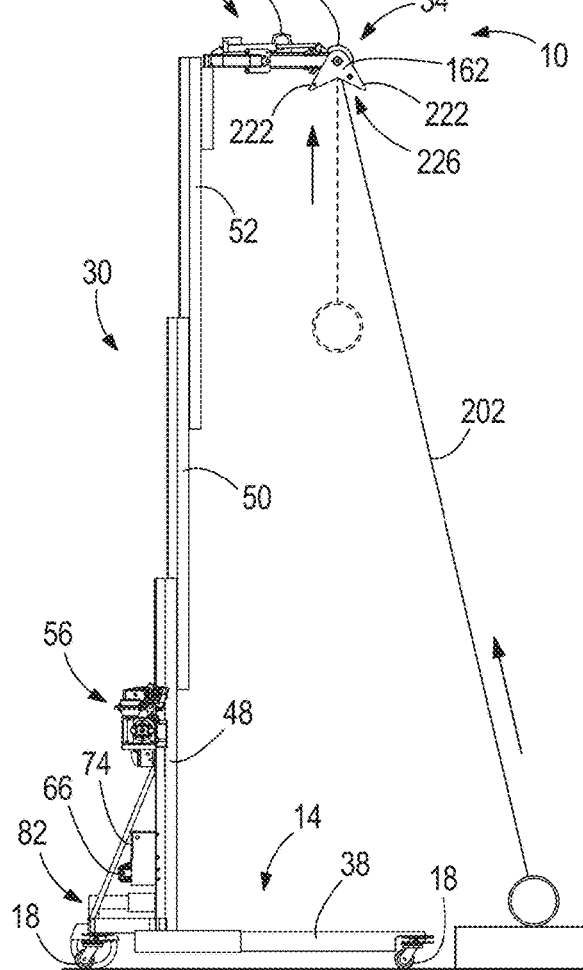
FIG. 15 is a side view of the lifting device illustrating a pipe being non-rigidly lifted.

FIG. 15 illustrates an alternative non-rigid lifting operation. In the illustrated embodiment, the mast portions 50, 52 are extended to a desired height. The operator secures the pipe to the cable 202 (e.g., via a strap) and may use the remote control 76 to activate the motor 190. Activation of the motor 190 retracts the cable 202 on the spool 206, thereby (non-rigidly) lifting the pipe from above and towards the recesses 226 of the first and second arms 162, 166. Once the pipe engages the recess 226 of the arms 162, 166, the operator may maneuver the carriage 34 to the desired position (e.g., as described above with reference to FIGS. 10-14).

Figure 16:
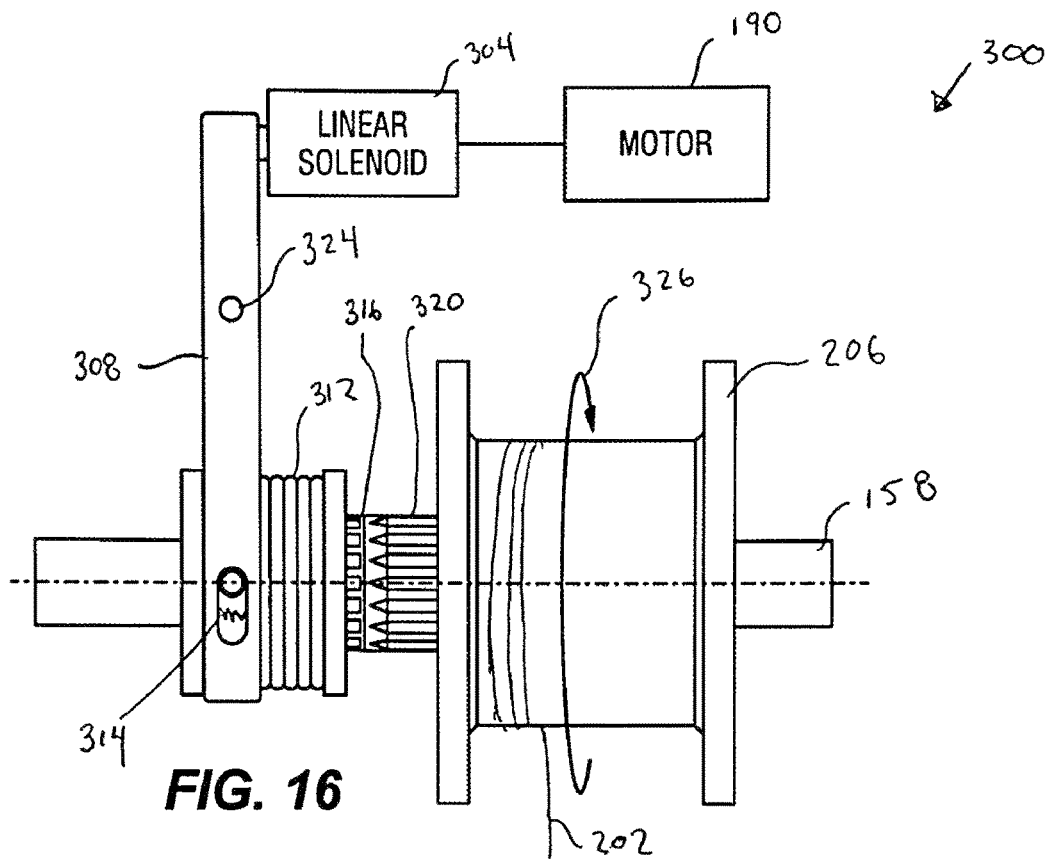
FIG. 16 is a side view of a power takeoff mechanism where a sleeve is in a first position.
Figure 17:
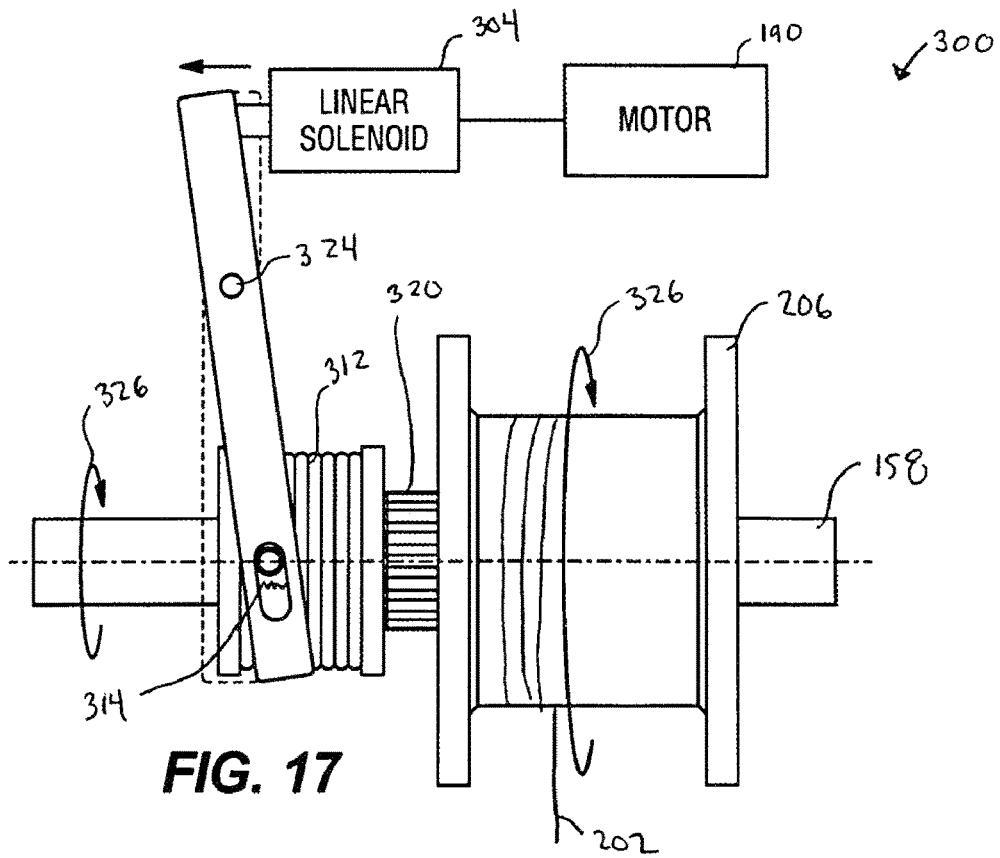
FIG. 17 is a side view of a power takeoff mechanism where the sleeve is in a second position.
Figure 18:
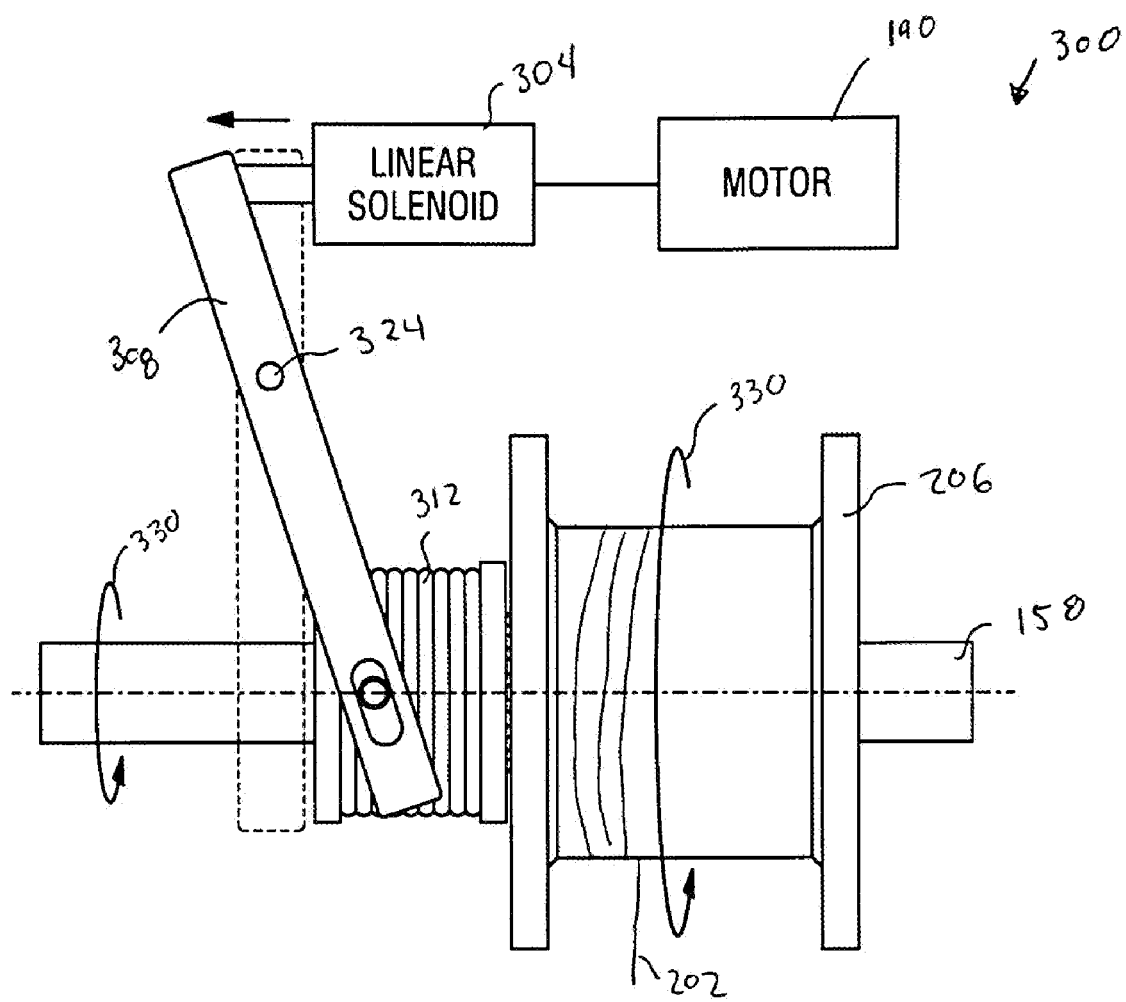
FIG. 18 is a side view of a power takeoff mechanism where the sleeve is in a third position.

FIGS. 16-18 illustrate a power takeoff mechanism 300 that is electrically coupled to the motor 190 of the lifting device 10 to selectively control movement of the rotary shaft 158 of the carriage 34 during a non-rigid lifting operation. The power takeoff mechanism 300 includes a linear solenoid 304 coupled to a lever 308, and a sleeve 312 coupled to the lever 308 and the rotary shaft 158. The power takeoff mechanism 300 further includes a biasing member 314 positioned between the lever 308 and the sleeve 312. The rotary shaft 158 has a first set of teeth 316 and the spool 206 has a second set of teeth 320. The sleeve 312 is sized to selectively engage with one or both of the first set of teeth 316 and the second set of teeth 320. For example, the linear actuator 304 selectively moves the sleeve 312 between a first position (FIG. 16), a second position (FIG. 17) and a third position (FIG. 18) in response to the stage of the lifting operation.

FIG. 16 illustrates the position (i.e., the first position) of the sleeve 312 when the pipe is being non-rigidly lifted (FIGS. 9, 10, and 14). In the first position, the sleeve 312 is in contact with only the teeth 316 of the rotary shaft 158 so the spool 206 may rotate freely on the rotary shaft (e.g., without moving the rotary shaft 158). As a result, activation of the motor 190 winds the cable 202 around the spool 206 in a first direction (e.g., a clockwise direction) to non-rigidly lift the pipe.

FIG. 17 illustrates the position (i.e., the second position) of the sleeve 312 when the pipe is positioned within the recess 226 of the arms 162, 166 (FIG. 10), which activates the linear solenoid 304. Activation of the linear solenoid 304 causes the lever 308 to pivot about a pivot point 324, which causes the sleeve 312 to axially move towards the spool 206. In the second position, the first set of teeth 316 and the second set of teeth 320 are misaligned so the sleeve 312 is unable to engage with the second set of teeth 320. In order to ensure the sleeve 312 and the second set of teeth 320 remain disengaged, the lever 308 compresses the biasing member 314. As a result, the rotary shaft 158 and the spool 206 are able to rotate together in the first (i.e., winding) direction 326.

FIG. 18 illustrates the position (i.e., the third position) of the sleeve 312 when the pipe is positioned within the recess 226 of the arms 162, 166 (FIG. 10) and the first and second set teeth 316, 320 (FIG. 16) are aligned. The first and second set of teeth 316, 320 may align when the arms 162, 166 contact a hard stop (e.g., the spoke post 230 engages the spoke catch 234, FIG. 6) or the spool 206 is driven in a second direction 330 (e.g., a counterclockwise direction). Activation of the linear solenoid 304 causes the lever 308 to pivot about the pivot point 324, which causes the sleeve 312 to axially move towards the spool 206. In the third position, the alignment of first and second set teeth 316, 320 allows the rotary shaft 158 and the spool 206 to rotate together in the second direction 330 so the pipe can be lowered.

Figure 19:
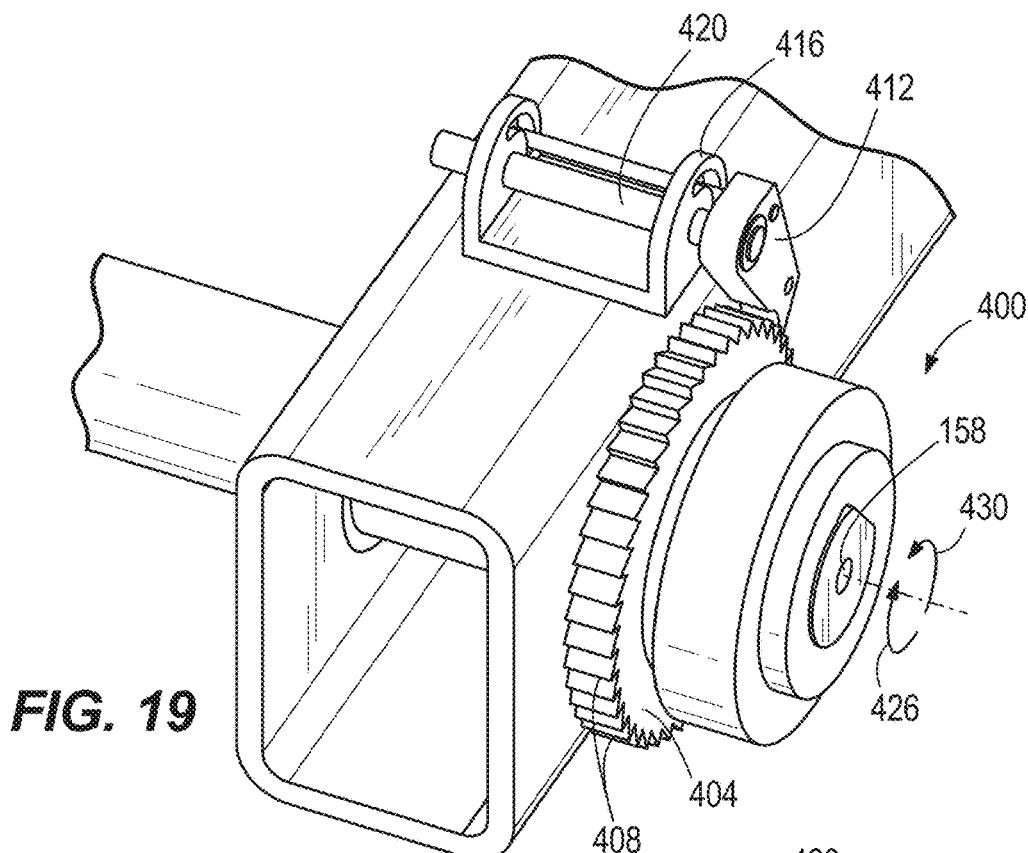
FIG. 19 is a perspective view of a drive mechanism for a lifting device.
Figure 20:
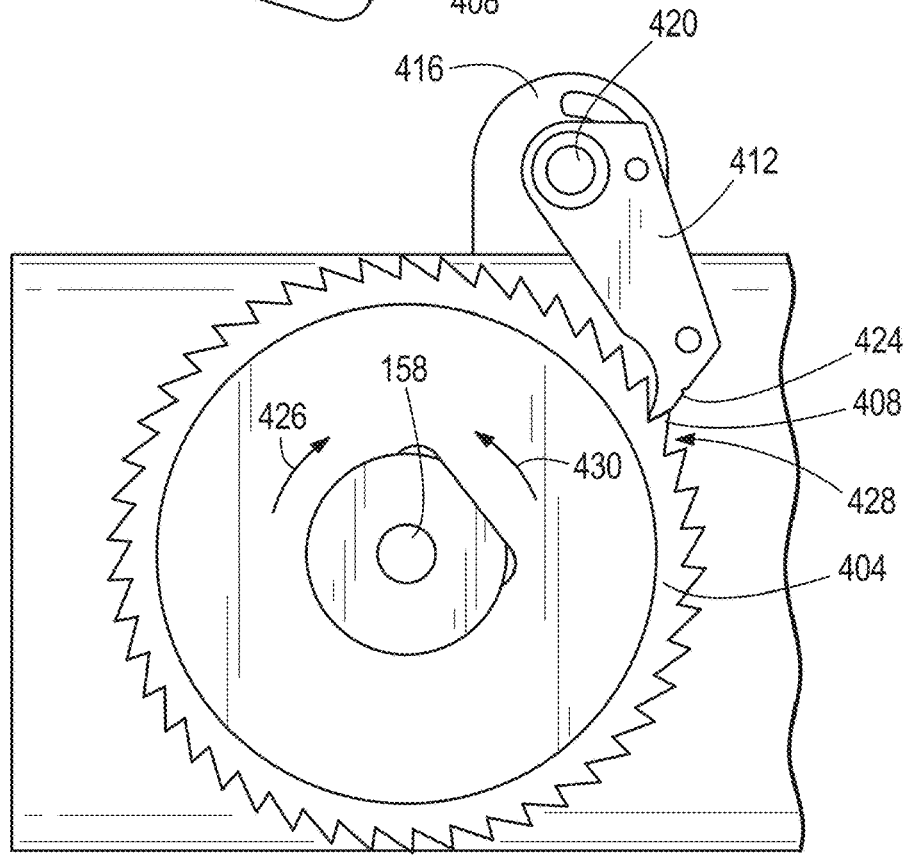
FIG. 20 is a side view of the drive mechanism of FIG. 19

FIGS. 19 and 20 illustrate an exemplary embodiment of a drive mechanism 400 that may be used with the lifting device 10. In the illustrated embodiment, the drive mechanism 400 is operably coupled to the rotary shaft 158 of the carriage 34 to restrict unwanted movement of the arms 162, 166 (FIG. 6) during a rigid or non-rigid lifting operation. The drive mechanism 400 includes a ratchet 404 having a plurality of teeth 408 and a pawl 412 that selectively engages the teeth 408 of the ratchet 404 to selectively restrict movement of the ratchet 408 and the rotary shaft 158.

The pawl 412 is pivotably coupled to a support structure 416 via a pin 420. The pawl 412 defines a stop surface 424 that is sized to be received within a recess 428 defined between adjacent teeth 408 of the ratchet 404. During a lifting operation, the motor 190 (FIG. 6) drives the rotary shaft 156 in a first direction 426 (e.g., clockwise) or a second direction 430 (e.g., counterclockwise), which adjusts the relative position of the first and second arms 162, 166 of the carriage 34. When the pipe is being lifted, the motor 190 rotates the rotary shaft 158 and the ratchet 404 in the first direction 426. The construction of the teeth 408 of the ratchet 404 allows the pawl 412 to move freely between adjacent teeth 408 when the rotary shaft 158 and the ratchet 404 rotates in the first direction 426.

Once the motor 190 is deactivated, the rotary shaft 158 and the ratchet 404 stop rotating in the first direction 426 and the stop surface 424 of the pawl 412 engages with one of the teeth 408 of the ratchet 404. As a result, the pawl 412 acts as a safety mechanism to reduce movement of the rotary shaft 158 in the second direction 430. In order to allow rotation of the rotary shaft 158 in the second direction 430, the pawl 412 is actuated or pivoted about the pin 420 so the stop surface 424 disengages the teeth 408. As a result, the rotary shaft 158 and the ratchet 404 may freely move in the second direction 430. For example, the position of the pawl 412 may be manually adjusted by an operator. In other embodiments, a remote control may include a button that selectively controls the position of the pawl 412.

Figure 21:
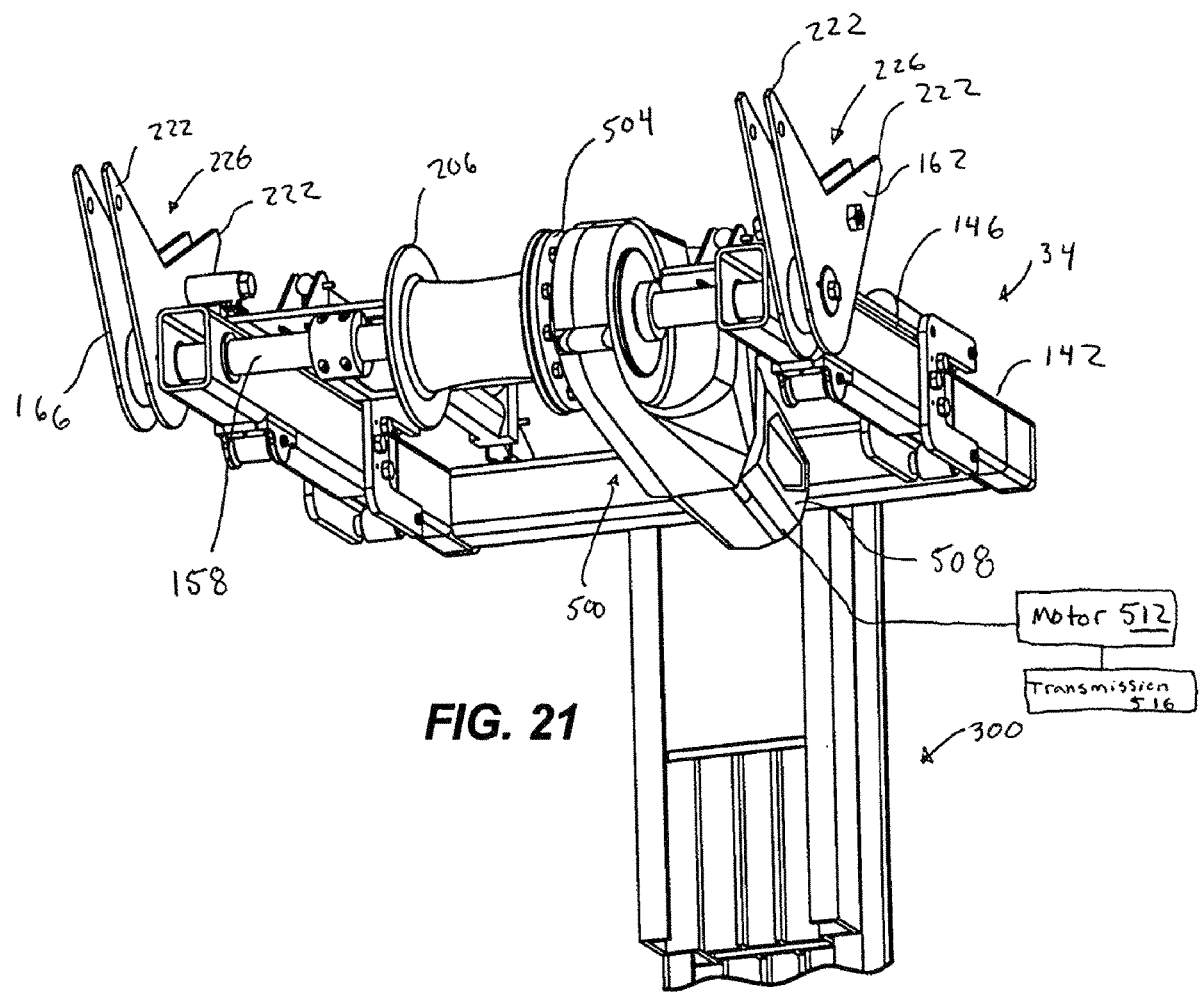
FIG. 21 is a perspective view of a carriage of a lifting device having a drive mechanism according to another embodiment of the disclosure.

FIG. 21 illustrates an alternative drive mechanism 500 that may be implemented on the carriage of the lifting tool 10. The drive mechanism 500 may be directly coupled to the rotary shaft 158 of the carriage 34 via a flange connector 504. The drive mechanism 500 may be secured within a housing 508 and include a motor 512 and a direct drive transmission 516. For example, the remote control may be operably coupled to the drive mechanism and control forward (e.g., counterclockwise rotation of the arms) and rearward (e.g., clockwise rotation of the arms) movement of the motor. Such a drive mechanism 50 is disclosed in U.S. patent application Ser. No. 16/288,160 filed on Feb. 28, 2019, the entire content of which is incorporated herein by reference.

Figure 22:
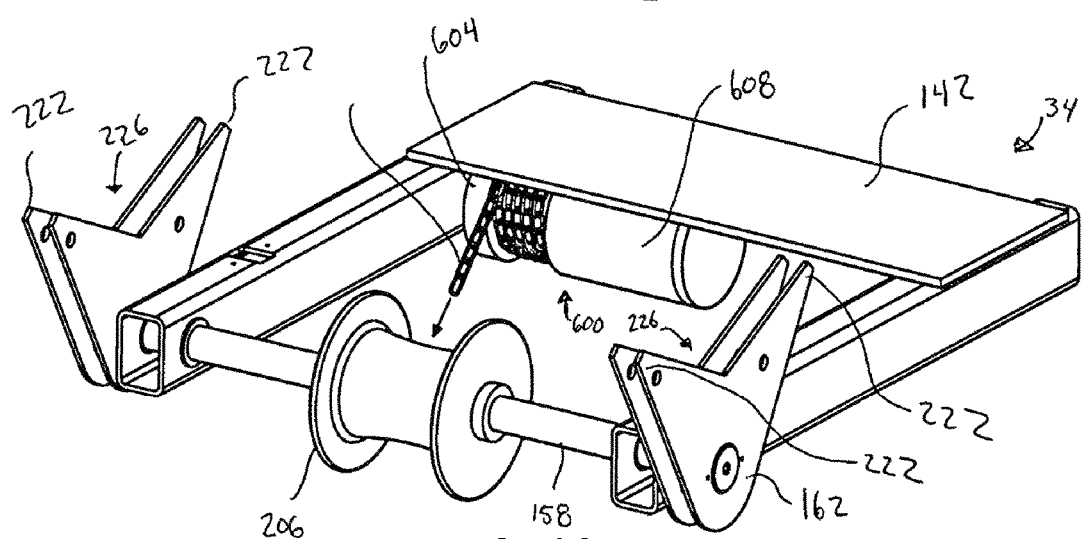
FIG. 22 is a perspective view of a carriage of a lifting device having a drive mechanism according to another embodiment of the disclosure.

FIG. 22 illustrates yet another drive mechanism 600 that may be implemented on the carriage 34 of the lifting tool 10. The drive mechanism 600 includes a chain hoist 604 mounted on an underside of the first carriage portion 142. The chain hoist 604 is driven by a motor 608 and includes a chain 612 that extends between the chain hoist 604 and the spool 206 coupled to the rotary arm of the carriage 34.

Figure 23A:
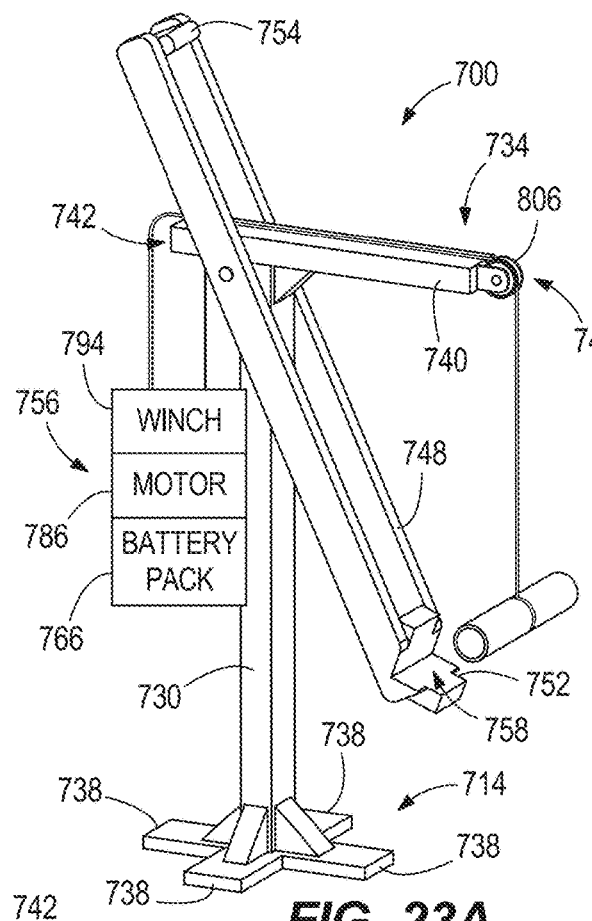
FIG. 23A is a perspective view of a lifting device according to another embodiment of the disclosure.

FIG. 23A illustrates a lifting device 700 according to another embodiment of the invention. The lifting device 700 is like the lifting device 10 shown in FIG. 1 and described above. Therefore, like features are identified with like reference numerals plus "700," and only the differences between the two will be discussed herein.

The lifting device includes a base 714, a mast 730 coupled to the base 714, a carriage 734 coupled to the mast 730, and a lifting and moving means 756. In the illustrated embodiment, the base 714 includes four legs 738 that extend outward from the mast 730. The mast 730 is formed of a single mast portion that is rigidly coupled to the base 714. In other embodiments, the mast 730 may be constructed like the mast 30 of the lifting device 10 (to include movable mast portions).

The carriage 734 includes a support beam 740 that extends laterally outward from the mast 730 (e.g., in a cantilever-like manner). The carriage 734 includes a first end 742 coupled to the mast 730 and a second end 744 laterally spaced from the first end 740. The lifting device 700 further includes an arm 748 that is pivotably coupled to the mast 730. The arm 748 has a second carriage 752 located at a first distal end of the arm 748 and a handle 754 located at a second distal end. The arm 748 may be used to assist a lifting operation or lift a pipe to an elevation above the carriage 734 (e.g., vertically above). The second carriage 752 defines a pipe receiving recess 758 that has a V-shaped profile so pipes of different sizes can be secured within the recess 758.

Figure 24:
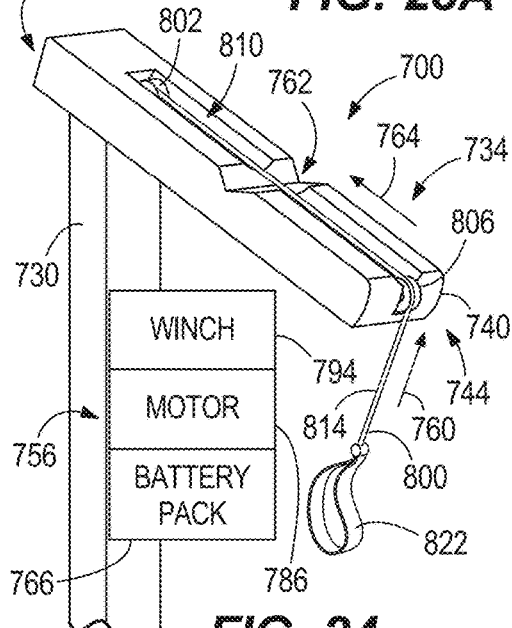
FIG. 24 is a perspective view of a portion of the lifting assembly of FIG. 23A.
Figure 25:
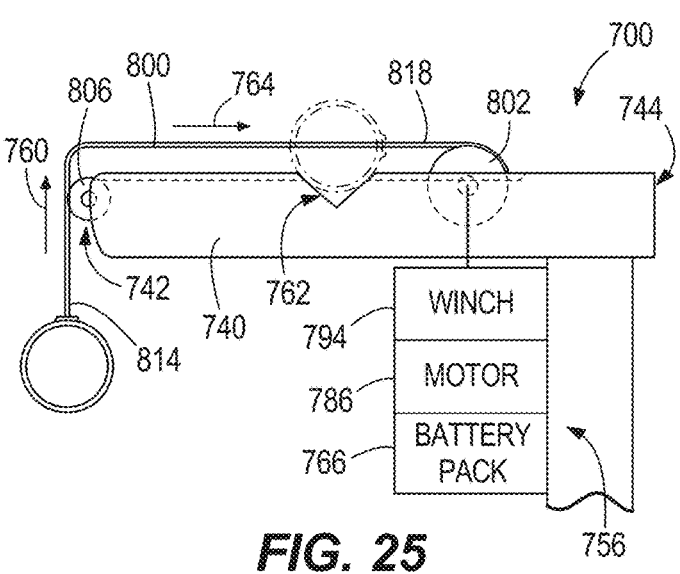
FIG. 25 is a side view of a portion of the lifting assembly of FIG. 23A.

Now with reference to FIGS. 24 and 25, the first carriage 734 includes a pipe receiving recess 762 formed on a top portion of the carriage 734. The pipe receiving recess 762 extends a width of the carriage 734 and has a V-shaped profile so pipes of different sizes can be secured within the recess 762.

Figure 23B:
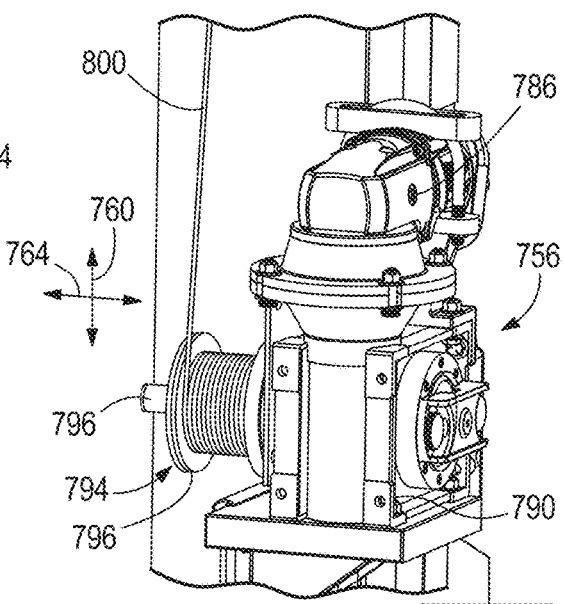
FIG. 23B is a perspective view of is a lifting assembly for the lifting device of FIG. 23A

FIG. 23B illustrates a lifting and moving means 756 that is coupled to the mast 730 and is operable to lift a pipe in a first (vertical) direction 760 to a desired height and move the pipe along the carriage 734 in a second (lateral) direction 764 that is transverse to the first direction 760. The lifting and moving means 756 includes an electric motor 786, a gearbox assembly 790, a winch 794 driven by the electric motor 786, and a battery pack 766. The winch 794 includes a spool 796 having a rotary shaft 796 and a cable 800 wound around the rotary shaft 796. The cable 800 extends between the winch 794 and the carriage 734. It should be appreciated that the lifting and moving means 756 may be coupled to the mast 730, the base 714, or directly to the carriage 734.

Now with reference to FIGS. 24 and 25, the carriage 734 further includes a first guide roller 802 positioned adjacent the first end 742 of the carriage 734 and a second guide roller 806 that is positioned adjacent the second end 744 of the carriage 734. The cable 800 of the winch 794 is guided along the first and second guide rollers 802, 806 and through a cable receiving recess 810 formed on the top surface of the carriage 734. The cable 800, when unwound from the rotary shaft 796 of the winch 794, includes a first segment 814 that extends in the first direction 760 and a second segment 818 that extends in the second direction 764. The operator may attach a pipe to a distal end of the first segment 814 of the cable 800 via a strap 822.

During operation, the operator may activate the electric motor 786 (e.g., via a remote controller similar to the remote control 76) to alternately wind and unwind the cable 800 (e.g., by rotating the rotary shaft 796). When the cable 800 winds around the spool 794, the pipe moves in the first (vertical) direction 760 towards the carriage 734. When the pipe reaches the carriage 734, the pipe rolls over the second guide roller 806 and is subsequently supported by the carriage 734. As the cable 800 continues to be wound onto the spool 794, the pipe is moved in the second direction 764 along the top surface of the carriage 734 until the pipe is seated within the pipe receiving recess 762.

FIGS. 26A and 26B illustrate operation of the arm 748 of the lifting device 700 to lift the pipe to a higher elevation than the first carriage 734. For example, the operator may attach the pipe to the cable 800 and lift the pipe in the first direction 760 until the second carriage 752 defined in the first distal end of the arm 748 can receive the pipe (FIG. 26A). The operator may then grasp the handle 754 and move the handle 754 downward from the first position (FIG. 26A) to the second position (FIG. 26B). As a result, the pipe is lifted to a higher elevation than the first carriage 748. In some embodiments, the lifting and moving means 756 may be coupled to the arm 748 to move the arm between the first position and the second position.

FIGS. 27-30 illustrate a lifting device 900 according to another embodiment of the invention. The lifting device 900 is like the lifting device 10 shown in FIG. 1 and described above. Therefore, like features are identified with like reference numerals plus "900," and only the differences between the two will be discussed herein.

The lifting device 900 is able to non-rigidly lift (e.g., lift from above) and rigidly lift (e.g., lift from below) materials (e.g., pipes, weights, etc.) and move the material to a desired height and location (e.g., an installation height). The lifting device 900 includes a base 914 having a plurality of wheels 918, a mast 930 coupled to and supported by the base 914, an outrigger or ramp system 932 coupled to the base 914, and a carriage 934 coupled to the mast 30.

In the illustrated embodiment, the base includes parallel first and second frame rails 938 and a pair of cross-beams 942 that forms a central base portion and additional rails 944 that obliquely extend from the central base portion. The wheels 918 are coupled to each corner of the central base and to each of the additional rails 944. As a result, eight wheels 918 support the base 914 of the lifting device 900 relative to the ground.

The mast 930 has a first (stationary) mast portion 948 that is rigidly coupled to the base 914, and second, third, fourth, and fifth (movable) mast portions 949, 950, 951, 952 that are coupled to and movable relative to the first mast portion 948 and the base 914. In other embodiments, more or fewer mast portions may be used. In the illustrated embodiment, each mast portion 948, 949, 950, 951, 952 of the mast 930 includes a telescoping structure that engages with a corresponding mast portion so the mast 930 and the carriage 934 are movable between a plurality of positions. For example, the mast 930 is movable between a collapsed position (FIG. 27) and an extended position (FIG. 28). The telescoping structures may be a track formed on an outer surface of the mast portions 948, 949, 950, 951, 952. The track may receive a roller that allows movement of the mast portions 949, 950, 951, 952 relative to the first mast portion 948 and each other.

In the illustrated embodiment, the first mast portion 948 is positioned in a central position between a front portion 954 of the base 914 and a rear portion 958 of the base 914. The second, third, fourth, and fifth mast portions 949, 950, 951, 952 are connected in parallel with each other and extend towards the rear portion 958 of the base 914 (e.g., the fifth mast portion 952 is closest to the rear portion 958 of the base 914). During translation of the mast 930 to the extended position, the movable mast portions 949, 950, 951, 952 translate or telescope in a rearward direction. In other words, the second mast portion 949 translates in a first direction 960 relative to the first mast portion 948, the third mast portion 950 translates in the first direction 960 relative to the second mast portion 949, and so forth.

The carriage 934 is coupled to the rearward-most mast portion (e.g., the fifth mast portion 952) and includes a pair of forks 1048, 1050 that are coupled to the mast 930 and a support structure 968 coupled to and extending forward of the forks 1048, 1050 (e.g., towards the front portion 954 of the base 914). A gap 972 is formed between the forks 1048, 1050 and the support structure 968 and is sized to surround the mast 930 so the support structure 968 is positioned forward of the mast 930. The support structure 968 includes a pair of angled support members 976 having a V-shaped geometry. The V-shaped geometry of the support members 976 allows the carriage 934 to accommodate pipes of different sizes.

Figure 28:
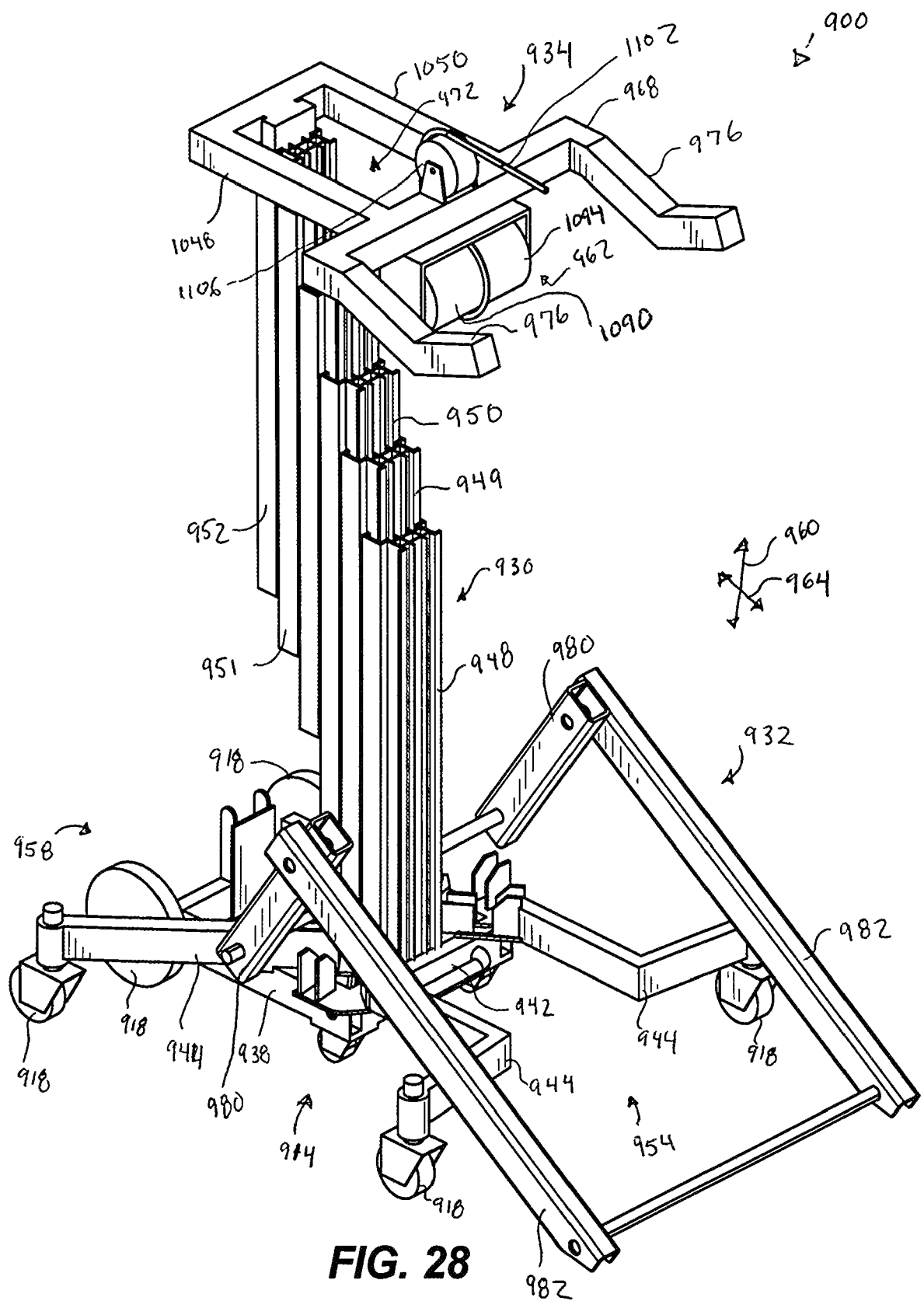
FIG. 28 is a perspective view of a lifting device of FIG. 27, where the lifting device is in an extended position.
Figure 29:
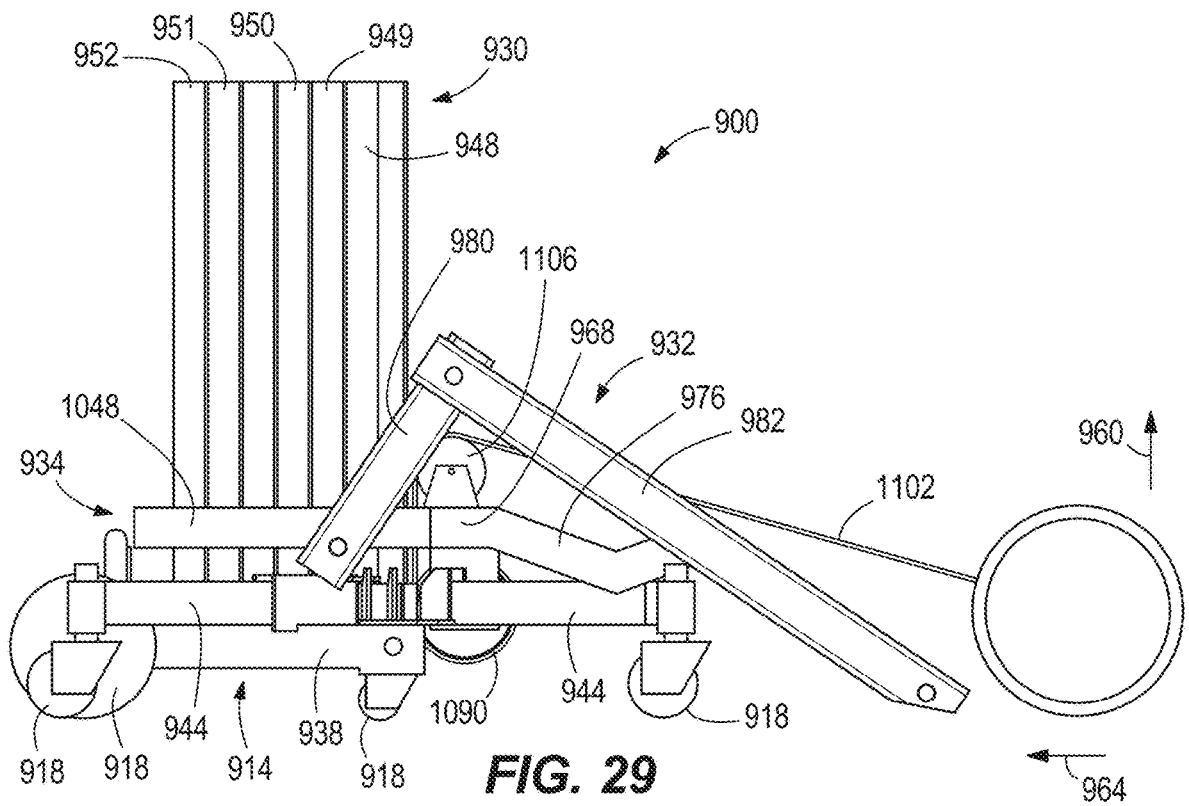
FIG. 29 is a side view of the lifting device of FIG. 27, illustrating a pipe being lifted by the lifting device.
Figure 30:
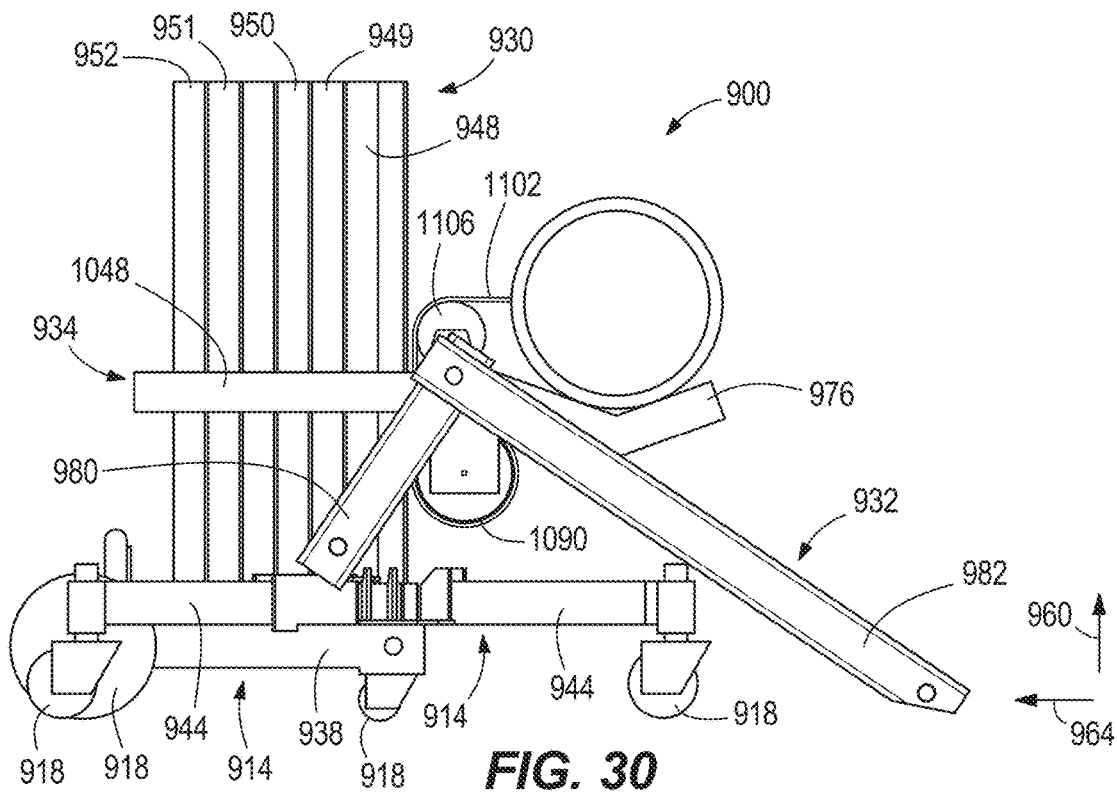
FIG. 30 is a side view of the lifting device of FIG. 27, illustrating a second position of the pipe as the pipe is being lifted by the lifting device.

The ramp system 932 is pivotably coupled to base 914 and includes a first pair of arms 980 and a second pair of arms 982. The first pair of arms 980 are pivotably coupled to the base 914 and the second pair of arms 982 are pivotably coupled to the first pair of arms 980. The ramp system 932 is movable between a retracted storage position (FIG. 27) and an extended loading position (FIGS. 28-30). In the loading position, the second pair of arms 982 define a ramp surface on which the pipe can slide. The ramp system 932 may be manually moved between the storage and lifting positions by the operator. In other embodiments, the ramp system 932 may be operably coupled to a drive mechanism to allow the operator to adjust the deployment of the ramp system 932 via a remote control.

Figure 27:
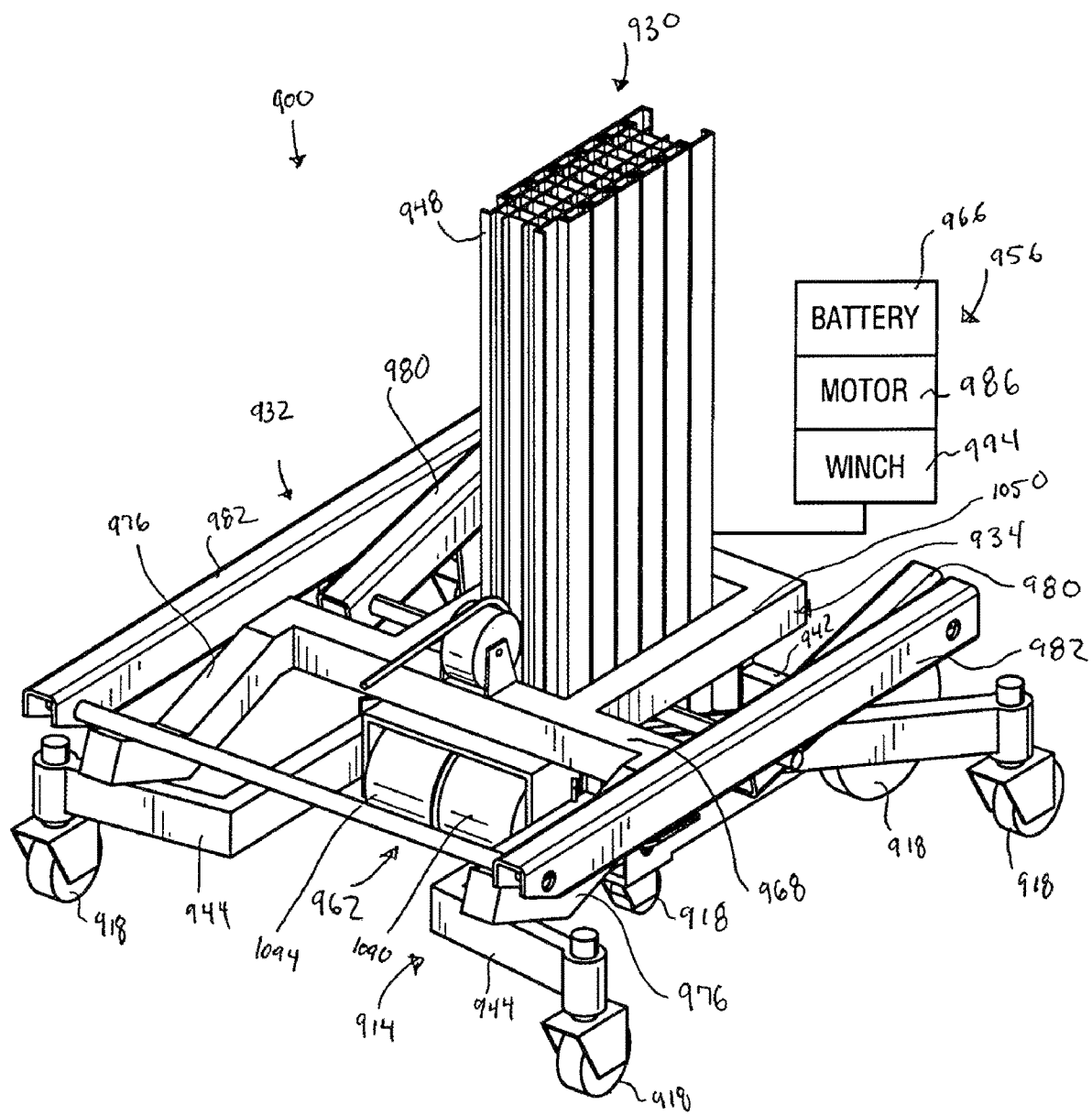
FIG. 27 is a perspective view of a lifting device according to another embodiment of the disclosure, where the lifting device is in a collapsed position.

Now with reference to FIG. 27, the lifting device 900 includes a lifting assembly 956 that is coupled to the mast 930 and is operable to move the mast 930 and the carriage 934 to a desired elevation. The lifting assembly 956 may be similar to the lifting assembly 56 described in detail above. For example, the lifting assembly 956 includes an electric motor 986, a winch 994 driven by the electric motor 986 and a battery pack 966 for providing electrical power to the motor 986. A positioning assembly 962 is coupled to the carriage 934 and may be operably coupled to the pipe being lifted to move the pipe in a second direction 964. For example, the positioning assembly 962 may guide the pipe along the ramp system 932 and onto the carriage 934.

The positioning assembly 962 includes an electric motor 1090 coupled to the support structure 968 of the carriage 934 and a winch 1094 having a cable 1102. The winch 1094 is operably coupled to and driven by the motor 1090. In the illustrated embodiment, the motor 1090 and the winch 1094 are coupled to an underside of the support structure 968 and a pulley 1106 is coupled to a top portion of the support structure 968 to guide the cable 1102 towards the support members 976. Both the lifting assembly 956 and the positioning assembly 962 receive electrical power from one or more battery packs 966 (illustrated schematically).

Figure 31:
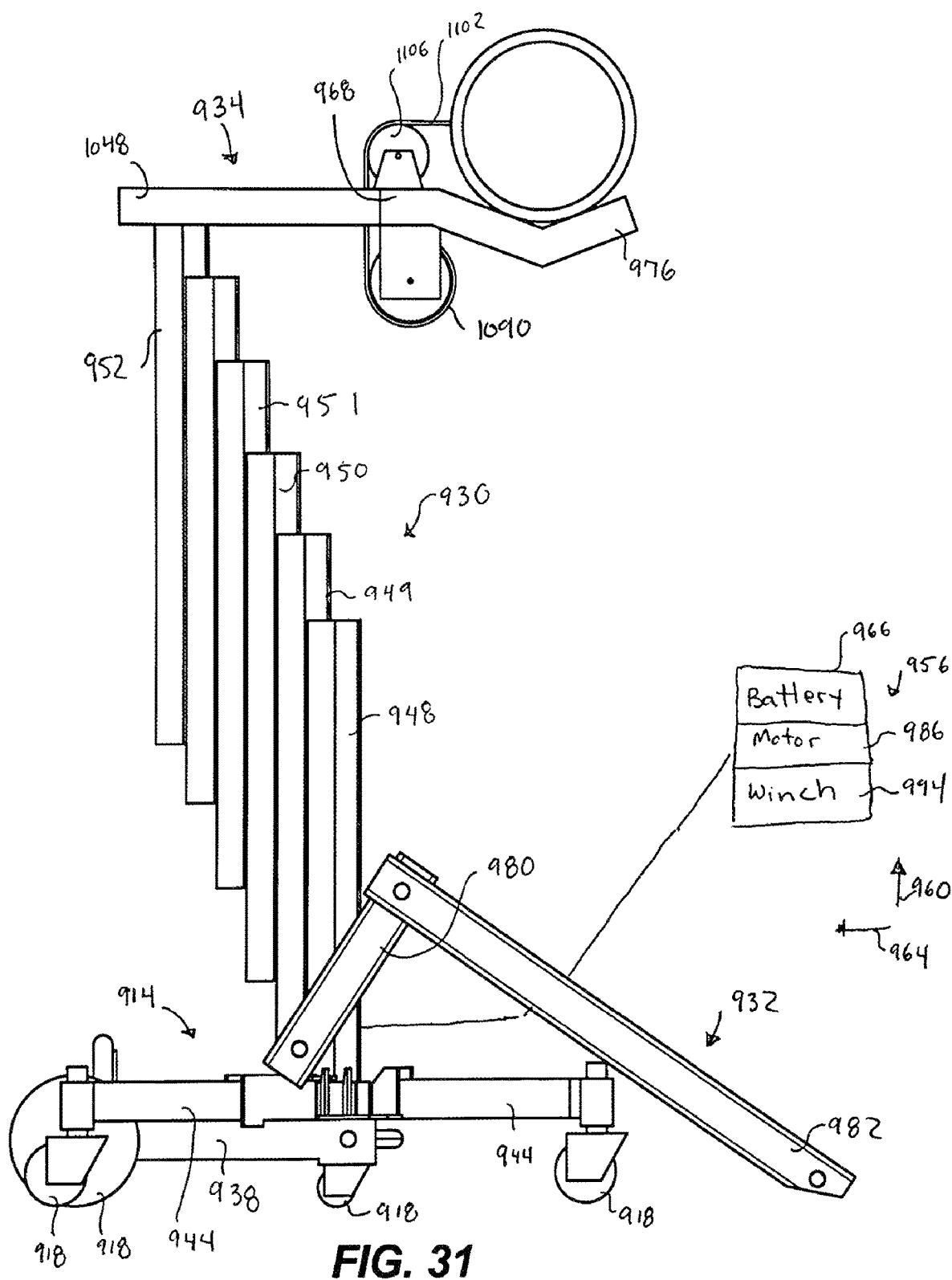
FIG. 31 is a side view of the lifting device of FIG. 27, illustrating the pipe being rigidly lifted in a first direction to an installation height

FIGS. 29-31 illustrate a lifting operation performed by the lifting device 900. To start the lifting operation, the ramp system 932 is extended to the loading position, the cable 1102 is coupled to the pipe, and the mast 930 is in the collapsed position (FIG. 29). As a result, the second pair of legs 982 provides a ramp surface that extends to an elevation that is higher than the carriage 934. Now with reference to FIG. 30, activation of the motor 1090 pulls the pipe along the ramp so the pipe moves both in the in first direction 960 (e.g., vertically above the carriage 934) and in the second direction 964 (e.g., laterally towards the carriage 934). Once the pipe reaches a position on the ramp system 932 that is directly above the carriage 934, the carriage 934 is moved in the first direction 960 to lift the pipe off the ramp system 932 so the carriage 934 supports the pipe from below (FIG. 30).

Now with reference to FIG. 31, activation of the motor 986 of the lifting assembly 956 translates the movable mast portions 949, 950, 951, 952 and the carriage 934 in the first direction 960 relative to the base 914 to allow the pipe to be moved to the desired height. While the pipe is being lifted, the ramp system 932 may remain in the loading position to improve the stability of the lifting device 900.

Figure 32:
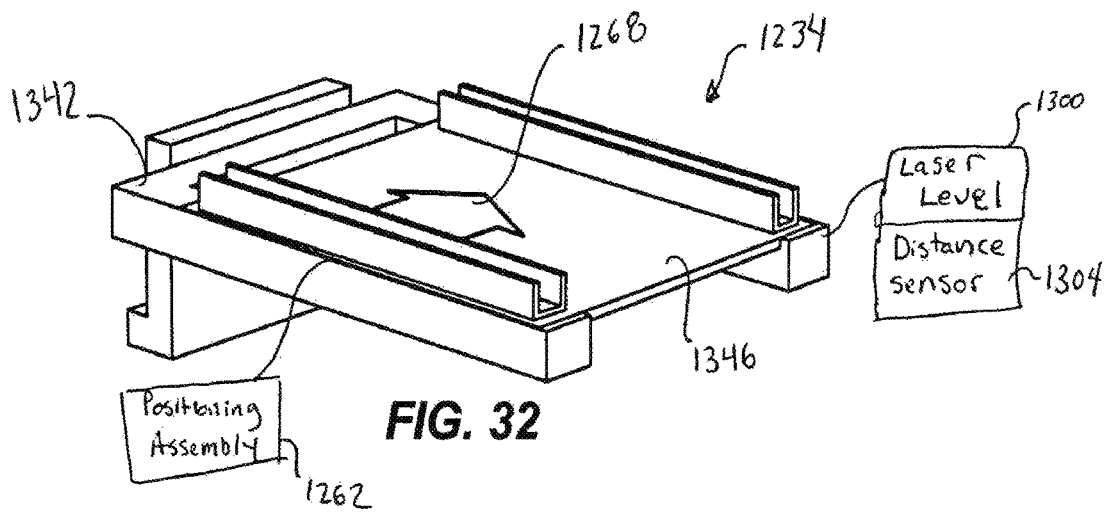
FIG. 32 is a perspective view of a carriage for a lifting device where the carriage is in a first position.
Figure 33:
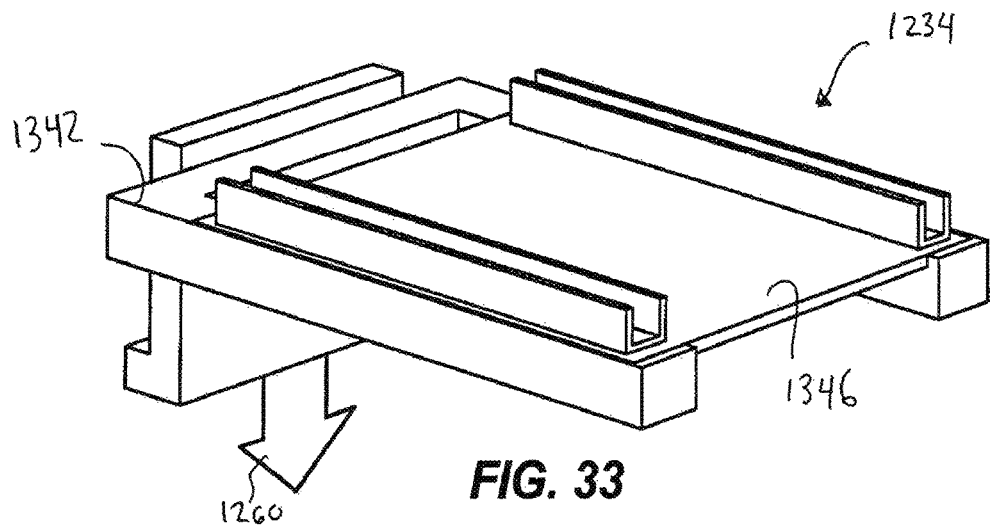
FIG. 33 is a perspective view of the carriage of FIG. 32 where the carriage is in a second position.
Figure 34:
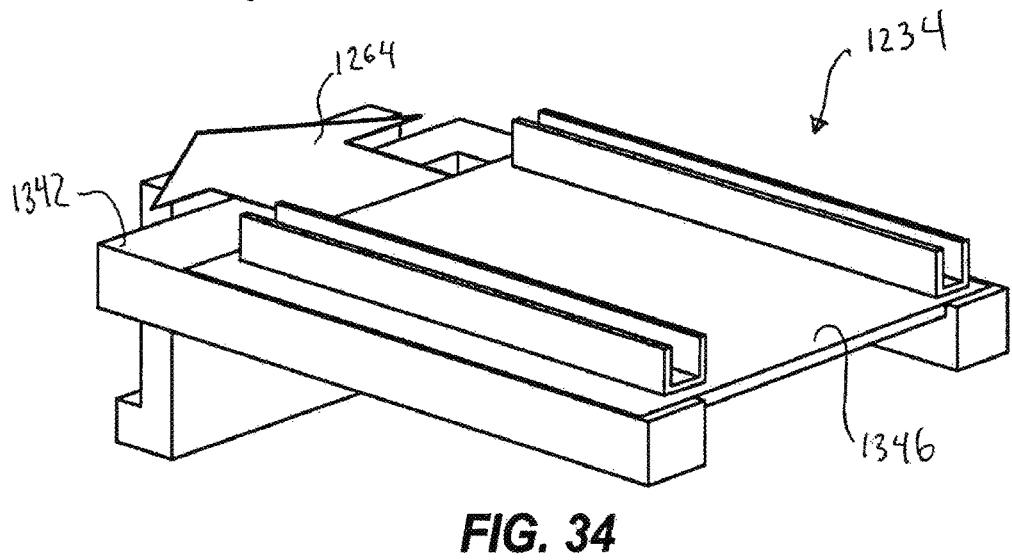
FIG. 34 is a perspective view of the carriage of FIG. 32 where the carriage is in a third position.

FIGS. 32-34 illustrate a carriage 1234 that may be used with the lifting devices 10, 700, 900 described in detail above. The carriage 1234 includes a first carriage portion 1342 and a second carriage portion 1346 that is coupled to and movable relative to the first carriage portion 1342. For example, the carriage 1234 may include a positioning assembly 1262 positioned between the first and second carriage portions 1342, 1346. The positioning assembly 1262 is operable to move the second carriage portion 1346 with three degrees of freedom. For example, the positioning assembly 1262 may move the second carriage portion 1346 relative to the first carriage portion 1342 in a first direction 1260 (e.g., vertically up or down, FIG. 33), in a second direction 1264 (e.g., laterally towards or away from the first carriage portion 1342) transverse to the first direction 1260, and in a third direction 1268 (e.g., laterally or side to side) transverse to the first and second directions 1260, 1264. The positioning assembly 1262 allows the operator to micro-adjust the position of the second carriage portion 1346 relative to the first carriage portion 1342. The positioning assembly 1262 may be powered or unpowered. For example, the positioning assembly 1262 may to be manually adjusted prior to a lifting operation (e.g., when the carriage is in a collapsed position) or may be adjusted via a remote control (e.g., when the positioning assembly 1262 is powered).

The carriage 1234 may further include a laser level 1300 and a distance sensor 1304 to alert the operator of the position of the carriage 1234 relative to surrounding structures. For example, the laser level 1300 may be oriented and project in one or more of the first, second, or third directions 1260, 1264, 1268 to allow the operator to determine the lifting path of the carriage 1234. The distance sensor 1304 may be oriented in one or more of the first, second, or third directions 1260, 1264, 1268 to determine the distance of the carriage 1234 from the ground, the ceiling, a wall or other structures.

Figure 35:
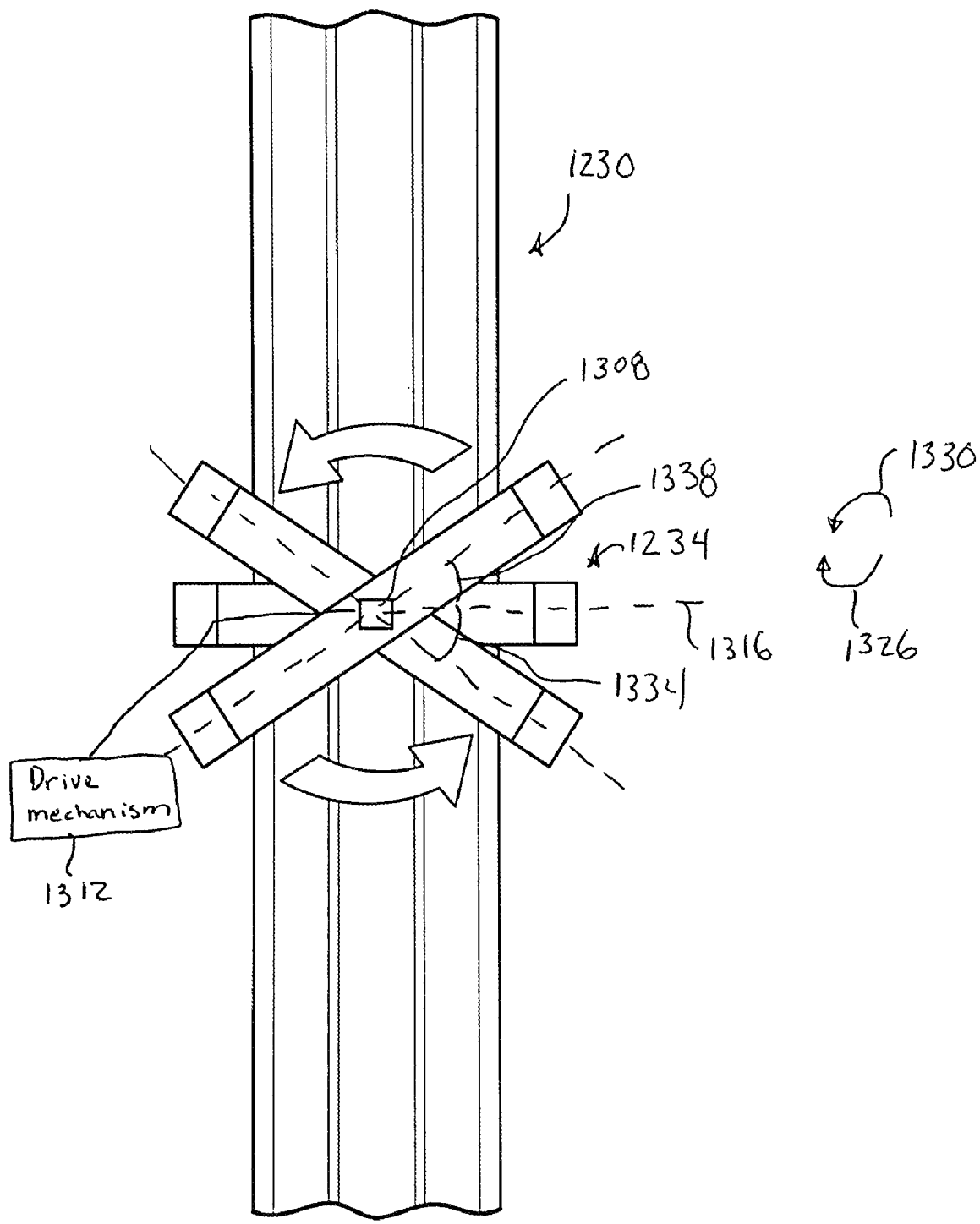
FIG. 35 is a front view of the carriage illustrating pivotal movement of the carriage of FIG. 32.

As illustrated in FIG. 35, the carriage 1234 may be pivotably mounted to a mast 1230. For example, the carriage 1234 is pivotably coupled to the mast 1230 at a pivot point 1308 via a drive mechanism 1312, which reduces the strain on the operator when the pipe is being unloaded from the carriage 1234. The operator may selectively activate the drive mechanism 1312 to pivot the carriage 1234 relative to a horizontal axis 1316 in a first direction 1326 (e.g., clockwise) and a second direction 1330 (e.g., counterclockwise). The drive mechanism 1312 may restrict the pivotable movement of the carriage 1234 beyond a first angle 1334 when the carriage 1234 is rotated in the first direction 1326 and restrict the movement of the carriage 1234 beyond a second angle 1338 when the carriage 1234 is rotated in the second direction 1330. In the illustrated embodiments, the first and second angles 1334, 1338 are approximately twenty-five degrees from the horizontal axis 1316.

Activation of the drive mechanism 1312 to pivot the carriage 1234 may be powered or unpowered. For example, the operator may manually adjust the drive mechanism 1312 (e.g., via a lever, a jack, etc.). In other embodiments, the drive mechanism 1312 may include an electric motor that can be activated via a remote control to pivot the carriage 1234.

Various features of the invention are set forth in the following claims.

What is claimed is:

1. A device configured to lift and transport a pipe at a worksite, the device comprising:
   a base;
   a mast coupled to the base;
   a carriage coupled to the mast upon which the pipe is supportable, the carriage including an arm defining a recess in which the pipe is receivable;
   a lifting assembly configured to move the mast and the carriage in a first direction to a desired elevation relative to the base; and
   a positioning assembly configured to move the carriage relative to the mast in a second direction that is transverse to the first direction, the positioning assembly including an actuator configured to adjust the arm between a first position, in which the recess is oriented downward, and a second position, in which the recess is oriented upward.

2. The device of claim 1, wherein the actuator is further configured to adjust the arm to a third position, in which recess extends in a lateral direction.

3. The device of claim 1, wherein the actuator is a rotary shaft configured to receive torque from the second electric motor, causing the rotary shaft to rotate the arm, in which the pipe is received, between the first and second positions.

4. The device of claim 3, further comprising a winch driven by the second electric motor, wherein the winch includes the cable wound around the rotary shaft, and wherein the second electric motor is configured to alternately wind and unwind the cable to rotate the rotary shaft.

5. The device of claim 3, wherein the arm is a first arm coupled to a first end of the rotary shaft, wherein the carriage further includes a second arm coupled to an opposite, second end of the rotary shaft, and wherein the second arm includes a recess that is rotationally aligned with the recess of the first arm to support the pipe therein.

6. The device of claim 5, wherein the base includes parallel first and second frame rails, wherein the pipe is supportable upon the first and second frame rails prior to being received within the recesses of the first and second arms, respectively, wherein the cable wound around the spool is attachable to the pipe while supported upon the first and second frame rails, and wherein the spool is configured to retract the cable, thereby pulling the pipe along the first and second frame rails toward the recesses of the first and second arms, in response to activation of the second electric motor.

7. The device of claim 6, wherein the base includes first and second ramps transitioning the first and second frame rails, respectively, to a surface of the worksite.

8. The device of claim 1, wherein the carriage includes a first carriage portion coupled to the mast and a second carriage portion that is movable relative to the first portion in the second direction, wherein the actuator is a first actuator, and wherein the positioning assembly includes a second actuator configured to adjust the second carriage portion between a retracted position, in which the second carriage portion is proximate the mast, and an extended position, in which the second carriage portion is located farther from the mast.

9. The device of claim 8, wherein the second actuator is a linear actuator having a first end mounted to the first carriage portion and a second end mounted to the second carriage portion.

10. The device of claim 8, wherein the battery pack provides electrical power to the second actuator.

11. The device of claim 8, further comprising a remote control including a first user control configured to activate the first electric motor and move the mast and carriage in the first direction, a second user control configured to activate the second electric motor and rotate the second actuator, thereby rotating the arm with the pipe received therein, between the first and second positions, and a third user control configured to activate the second actuator and move the second carriage portion between the retracted position and the extended position.

* * * * *